US011029293B2

(12) United States Patent
Caron et al.

(10) Patent No.: US 11,029,293 B2
(45) Date of Patent: Jun. 8, 2021

(54) METHOD AND SYSTEM FOR THE DETECTION OF A CHEMICAL SPECIES IN SOLUTION

(71) Applicant: INSTITUT NATIONAL D'OPTIQUE, Québec (CA)

(72) Inventors: Serge Caron, Québec (CA); Sébastien Dubus, Québec (CA); Christophe Rivière, Québec (CA); Simon Turbide, Québec (CA); Patrick Paradis, Québec (CA)

(73) Assignee: INSTITUT NATIONAL D'OPTIQUE, Québec (CA)

( * ) Notice: Subject to any disclaimer, the term of this patent is extended or adjusted under 35 U.S.C. 154(b) by 742 days.

(21) Appl. No.: 15/296,646

(22) Filed: Oct. 18, 2016

(65) Prior Publication Data

US 2018/0106772 A1     Apr. 19, 2018

(51) Int. Cl.
*G01N 31/22* (2006.01)
*B01L 3/00* (2006.01)
(Continued)

(52) U.S. Cl.
CPC ........ *G01N 31/22* (2013.01); *B01L 3/502746* (2013.01); *B01L 3/502784* (2013.01);
(Continued)

(58) Field of Classification Search
CPC ..... B01L 2200/0673; B01L 2300/0627; B01L 2400/082; B01L 3/502746;
(Continued)

(56) References Cited

U.S. PATENT DOCUMENTS 4,215,940 A    8/1980 Lübbers et al.
4,853,336 A    8/1989 Saros et al.
(Continued)

FOREIGN PATENT DOCUMENTS

GB    2097692 A  * 11/1982  ............... B01F 3/08
JP    2002-277478 A    9/2002
WO    84/02000 A1    5/1984

OTHER PUBLICATIONS

Hideaki Hisamoto, Takayuki Horiuchi, Manabu Tokeshi, Akihide Hibara and Takehiko Kitamori, "On-Chip Integration of Neutral Ionophore-Based Ion Pair Extaction Reaction", Mar. 15, 2001, pp. 1382-1386, vol. 73, No. 6, Analytical Chemistry.
(Continued)

*Primary Examiner* — Lyle Alexander
*Assistant Examiner* — Bryan Kilpatrick
(74) *Attorney, Agent, or Firm* — Merchant & Gould P.C.

(57) ABSTRACT

Methods and systems are for determining the concentration of a chemical species in an analyte solution. At least one train of segments are injected into a microfluidic channel having a first end and a second end, each train of segments having segments of analyte solution and segments of sensing solution which are immiscible with the segments of analyte solution. The train of segments is circulated from the first end to the second end of the microfluidic channel such that a reversible chemical exchange is established between the chemical species of each segment of analyte solution and a chemical indicator of the at least one contacting segment of sensing solution. The response of the chemical indicator is measured at the second end of the microfluidic channel and the concentration of the chemical species in the analyte solution is determined based on the response.

17 Claims, 11 Drawing Sheets

(51) Int. Cl.
G01N 21/77 (2006.01)
G01N 21/65 (2006.01)
G01N 21/78 (2006.01)

(52) U.S. Cl.
CPC ...... *G01N 21/77* (2013.01); *B01L 2200/0673* (2013.01); *B01L 2300/0627* (2013.01); *B01L 2300/0654* (2013.01); *B01L 2400/082* (2013.01); *G01N 21/65* (2013.01); *G01N 21/78* (2013.01); *G01N 2021/7733* (2013.01); *G01N 2021/7763* (2013.01); *G01N 2021/7786* (2013.01)

(58) Field of Classification Search
CPC ...... B01L 3/502784; G01N 2021/7763; G01N 21/77; G01N 21/78; G01N 31/22
See application file for complete search history.

(56) References Cited

U.S. PATENT DOCUMENTS

| | | | |
|---|---|---|---|
| 5,739,036 A * | 4/1998 | Parris | G01N 35/08 204/409 |
| 6,524,456 B1 | 2/2003 | Ramsey et al. | |
| 6,797,056 B2 | 9/2004 | David | |
| 7,864,321 B2 | 1/2011 | Caron et al. | |
| 8,120,774 B2 | 2/2012 | Fougeres et al. | |
| 8,622,987 B2 | 1/2014 | Ismagilov et al. | |
| 8,889,083 B2 | 11/2014 | Ismagilov et al. | |
| 2008/0297799 A1* | 12/2008 | Caron | G01N 21/7703 356/432 |
| 2011/0091150 A1* | 4/2011 | Caron | G01N 21/7703 385/12 |

OTHER PUBLICATIONS

Hideaki Hisamoto, Yuki Shimizu, Kenji Uchiyama, Manabu Tokeshi, Yoshikuni Kikutani, Akihide Hibara and Takehiko Kitamori, "Chemicofunctional Membrane for Integrated Chemical Processes on a Microchip", Jan. 15, 2003, pp. 350-354, vol. 75, No. 2, Analytical Chemistry.

Pascaline Mary, Vincent Studer and Patrick Tabeling, "Microfluidic Droplet-Based Liquid-Liquid Extraction", Apr. 15, 2008, pp. 2680-2687, vol. 80, No. 8, Analytical Chemistry.

Kurt Seiler, Werner E. Mort, Bruno Rusterholz and Wilhelm Simon, "Design and Characterization of a Novel Ammonium Ion Selective Optical Sensor Based on Neutral Ionophores", Oct. 1989, pp. 557-561, vol. 5, Analytical Sciences.

K Seiler and W Simon, "Theoretical aspects of bulk optode membranes", 1992, pp. 73-87, Analytica Chimica Acta, 266, Elsevier Science Publishers BV.

Xiaojiang Xie, Jingying Zhai, Gaston A. Crespo and Eric Bakker, "Ionophore-Based Ion-Selective Optical NanoSensors Operating in Exhaustive Sensing Mode", 2014, pp. 8770-8775, vol. 86, No. 17, Analytical Chemistry, ACS Publications.

Xiaojiang Xie, Jingying Zhai, Gaston A. Crespo and Eric Bakker, Supporting information for "Ionophore-Based Ion-Selective Optical NanoSensors Operating in Exhaustive Sensing Mode", 2014, University of Geneva, Department of Inorganic and Analytical Chemistry, 4 pages.

Xiaojiang Xie, Jingying Zhai and Eric Bakker, "pH Independent Nano-Optode Sensors Based on Exhaustive Ion-Selective Nanospheres", 2014, pp. 2853-2856, vol. 86, Analytical Chemistry, ACS Publications.

Xiaojiang Xie, Jingying Zhai and Eric Bakker, Supporting information for "pH Independent Nano-Optode Sensors Based on Exhaustive Ion-Selective Nanospheres", 2014, University of Geneva, Department of Inorganic and Analytical Chemistry, 4 pages.

Chao Xu, Katarzyna Wygladacz, Robert Retter, Michael Bell and Eric Bakker, "Multiplexed Flow Cytometric Sensing of Blood Electrolytes in Physiological Samples Using Fluorescent Bulk Optode Microspheres", 2007, pp. 9505-9512, vol. 79, No. 24, Analytical Chemistry, American Chemical Society.

Ke Xu, Peixi Zhu, Chun Huh and Matthew T. Balhoff, "Microfluidic Investigation of Nanoparticles' Role in Mobilizing Trapped Oil Droplets in Porous Media", 2015, pp. 13673-13679, vol. 31, No. 5, Langmuir, ACS Publications.

* cited by examiner

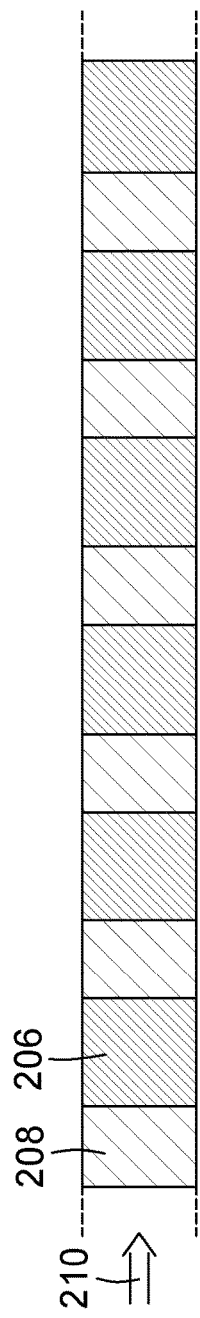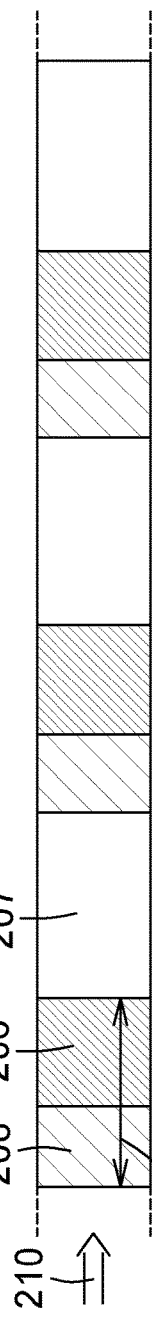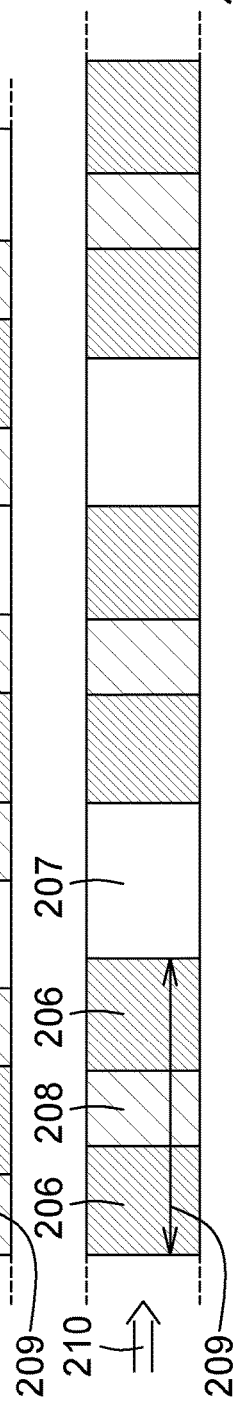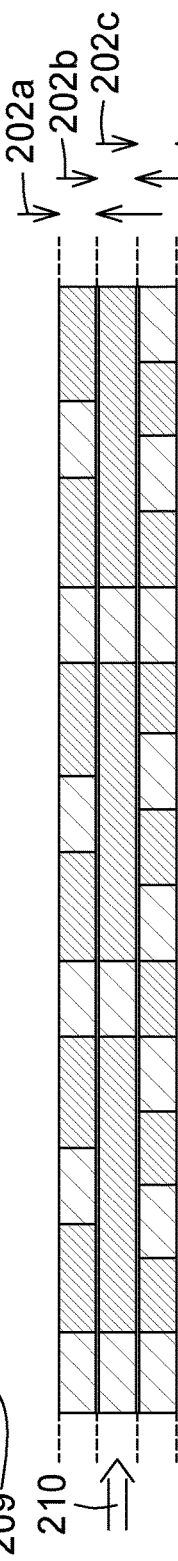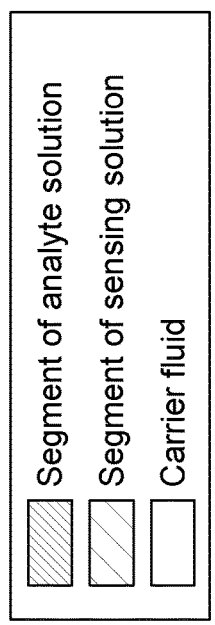

METHOD AND SYSTEM FOR THE DETECTION OF A CHEMICAL SPECIES IN SOLUTION

FIELD

The technical field generally relates to chemical sensors, and more particularly to methods and systems for the detection of chemical species using microfluidics.

BACKGROUND

Chemical sensors are used in many applications, including industrial, biomedical and clinical applications. Industrial applications include environmental emission control, agricultural industry, oil & gas industry and food industry. Examples of biomedical and clinical applications include determination of the pH or the presence of specific ions, oxygen, alcohol or other components of interest, in a sample.

Several chemical sensors which make use of polymer membranes or films are known in the art. The analyte to be detected is typically transported from the medium to be analyzed into the polymer membrane. The presence of the analyte inside the polymer membrane typically changes the optical response of the polymer membrane, and the analysis of the optical properties of the polymer membrane provides an indication about the presence of the analyte in the medium.

One limitation of existing polymer membranes is that their lifetime is limited, as some of their components tend to leach out over time. More specifically, a typical polymer membrane includes a chemical indicator responsive to a chemical species to be analyzed and can include a plasticizer in order to confer desired properties to the polymer. As the polymer membrane is contacted with a solution containing the analyte, the plasticizer typically leaches out over time. This can lead to a membrane having a mechanical cohesion which is no longer sufficient to function as a chemical sensor. Another possibility is that the chemical indicator can migrate out of the membrane, which can render the membrane decalibrated or inoperative after a certain amount of time.

In view of the above, many challenges still exist in the field of chemical sensors.

SUMMARY

In some embodiments, a method for determining a concentration of a chemical species in an analyte solution is provided. The method includes:
  providing a sensing solution immiscible with the analyte solution, the sensing solution including a chemical indicator responsive to the chemical species;
  injecting at least one train of segments into a microfluidic channel having a first end and a second end, each of the at least one train of segments including:
    segments of analyte solution having a volume Va; and
    segments of sensing solution having a volume Vs,
      wherein each of the at least one train of segments is characterized by a ratio r=Vs/Va, each segment of analyte solution being in surface contact with at least one contacting segment of sensing solution;
  circulating the at least one train of segments from the first end to the second end of the microfluidic channel, such that a reversible chemical exchange is established between the chemical species of each segment of analyte solution and the chemical indicator of the at least one contacting segment of sensing solution;
  measuring a response of the chemical indicator at the second end of the microfluidic channel; and
  determining the concentration of the chemical species in the analyte solution based on the response.

In some embodiments, at least one train of segments includes a plurality of trains of segments, and:
  circulating the at least one train of segments includes circulating each train of segments from the first end to the second end of the microfluidic channel, such that in each train of segments, the reversible chemical exchange is established between the chemical species of each segment of analyte solution and the chemical indicator of the at least one contacting segment of sensing solution;
  measuring a response of the chemical indicator includes measuring a response of the chemical indicator at the second end of the microfluidic channel for each train of segments, thereby obtaining a set of responses of the chemical indicator as a function of the ratio r; and
  determining the concentration of the chemical species includes determining the concentration of the chemical species in the analyte solution based on the set of responses.

In some embodiments, Vs is kept constant and Va is variable in order to obtain each value of the ratio r, or Va is kept constant and Vs is variable in order to obtain each value of the ratio r.

In some embodiments, the at least one train of segments has a predetermined number of segments.

In some embodiments, the at least one train of segments has an equal number of segments of analyte solution and segments of sensing solution.

In some embodiments, the reversible chemical exchange reaches an equilibrium state prior to measuring a response of the chemical indicator.

In some embodiments, the at least one train of segments includes sets of segments, each set of segments including at least one segment of analyte solution in surface contact with at least one segment of sensing solution, the sets of segments being separated from one another by a carrier fluid immiscible with the analyte solution and the sensing solution.

In some embodiments, the method further includes exposing the segments of sensing solution to the analyte solution prior to injecting the train of segments into the microfluidic channel.

In some embodiments, the analyte solution is an aqueous solution.

In some embodiments, the sensing solution includes an organic solvent.

In some embodiments, the response of the chemical indicator is an optical response.

In some embodiments, the chemical species is an ionic species and the reversible chemical exchange is a reversible ionic exchange.

In some embodiments, the chemical indicator includes:
  an ionic additive for providing electroneutrality in the sensing solution;
  an ion-selective ionophore able to reversibly bind the ionic species; and
  a chromoionophore for providing the response of the chemical indicator based on the binding of the ionic species and the ion-selective ionophore.

In some embodiments, the response includes a change in the perceivable color of the segments of sensing solution upon exposure to the chemical species.

In some embodiments, the response includes a change in optical absorption spectrum, optical transmission spectrum, reflection spectrum, Raman spectrum or fluorescence spectrum of the segments of sensing solution upon exposure to the chemical species.

In some embodiments, the method further includes regenerating the segments of sensing solution at the second end of the microfluidic channel.

In some embodiments, the sensing solution is free of the chemical species prior to injecting the sensing solution into the microfluidic channel.

In some embodiments, a method for determining a concentration of a chemical species in an analyte solution is provided. The method includes:
  providing a sensing solution immiscible with the analyte solution, the sensing solution including a chemical indicator responsive to the chemical species;
  injecting trains of segments into a microfluidic channel having a first end and a second end, each train of segments including:
    segments of analyte solution, each having a volume Va; and
    segments of sensing solution, each having a volume Vs, each segment of analyte solution being in surface contact with at least one contacting segment of sensing solution, each train of segments being characterized by a ratio r=Vs/Va;
  circulating each train of segments from the first end to the second end of the microfluidic channel, such that a reversible chemical exchange is established between the chemical species of each segment of analyte solution and the chemical indicator of the at least one contacting segment of sensing solution;
  measuring a response of the chemical indicator at the second end of the microfluidic channel for each train of segments, thereby obtaining a set of responses of the chemical indicator as a function of the ratio r; and
  determining the concentration of the chemical species in the analyte solution based on the set of responses.

In some embodiments, a system for detecting a chemical species in an analyte solution is provided. The system includes:
  a microfluidic channel having a first end and a second end;
  a flow control device configured to inject at least one train of segments into the microfluidic channel and to circulate the at least one train of segments from the first end to the second end of the microfluidic channel, each of the at least one train of segments including:
    segments of analyte solution having a volume Va; and
    segments of sensing solution having a volume Vs, wherein each of the at least one train of segments is characterized by a ratio r=Vs/Va, each segment of analyte solution being in surface contact with at least one contacting segment of sensing solution; and
  a detector configured to measure a response of the chemical indicator at the second end of the microfluidic channel,
  wherein the microfluidic channel is adapted such that a reversible chemical exchange is established between the chemical species of each segment of analyte solution and the chemical indicator of the at least one contacting segment of sensing solution during the circulation of the at least one train of segments.

In some embodiments, the system further includes a processor for determining the concentration of the chemical species in the analyte solution based on the response.

In some embodiments, the system further includes a control unit configured to vary the ratio r after each measurement of the response by the detector.

BRIEF DESCRIPTION OF THE DRAWINGS

FIG. 7A is a cross-sectional view of a microfluidic channel including segments of analyte solution and segments of sensing solution in surface contact with each other with a volumetric ratio r=2/3, according to an embodiment;

FIG. 7B is a cross-sectional view of a microfluidic channel including segments of analyte solution, segments of sensing solution and segments of carrier fluid in surface contact with each other, according to another embodiment;

FIG. 7C is a cross-sectional view of a microfluidic channel including segments of analyte solution, segments of sensing solution and segments of carrier fluid in surface contact with each other, according to yet another embodiment;

FIG. 7D is a cross-sectional view of a microfluidic channel including segments of analyte solution, segments of sensing solution and segments of carrier fluid in surface contact with each other, according to yet another embodiment;

FIG. 7E is a cross-sectional view of microfluidic channels mounted in parallel, each microfluidic channel including segments of analyte solution and segments of sensing solution in surface contact with each other with a different volumetric ratio r, according to yet another embodiment;

It will be noted that throughout the appended drawings, like features are identified by like reference numerals.

DETAILED DESCRIPTION

The present description provides methods and systems which may generally be useful in any application where it is desired to detect a chemical species in solution, or determine the concentration of a chemical species in solution. The detection of a chemical species in an analyte solution can be performed by contacting the analyte solution with a sensing solution including a chemical indicator, the sensing solution being immiscible with the analyte solution. A reversible chemical exchange can be established between the chemical species to be detected in the analyte solution and the chemical indicator of the sensing solution. A response of the chemical indicator can then be measured and the concentration of the chemical species can be determined based on the response. In some embodiments, the analyte solution and the sensing solution can be contacted with each other within a microfluidic channel.

The detection or concentration measurement may be selective to a specific chemical species. By way of example, embodiments of the methods and systems of the present description may be used in the detection/concentration measurement of chemical species in solution for industrial applications such as environmental emission control, agricultural and food industries, in the biomedical field, waste water management, water monitoring, and tailings water from mining processes.

Implementations of the Method

Figure 3:
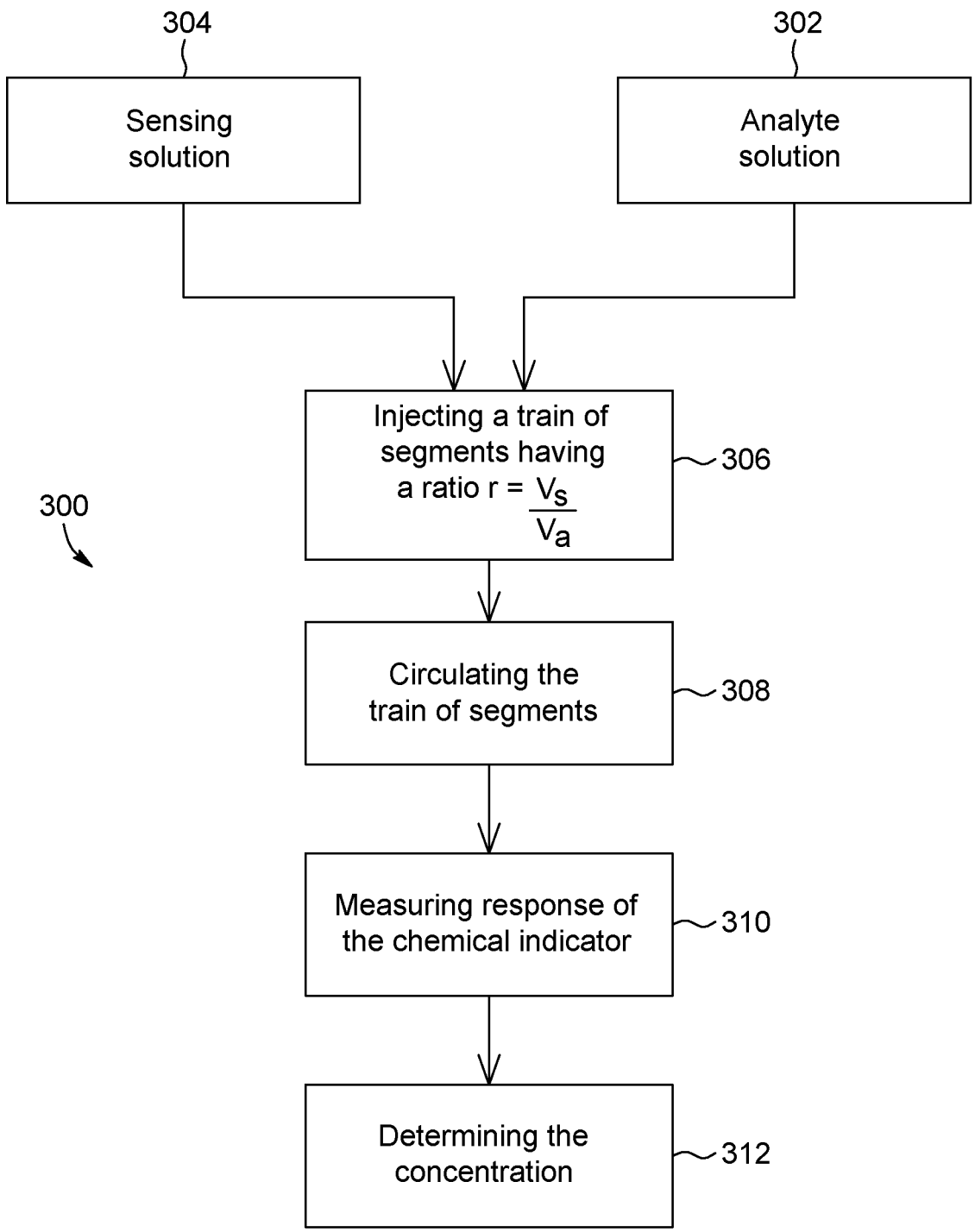
FIG. 3 is a process flow diagram of a method for measuring the concentration of a chemical species in solution, according to an embodiment.

Referring to FIG. 3, a method 300 for detecting a chemical species or measuring its concentration in an analyte solution 302 is provided.

The method first includes providing a sensing solution 304 which is immiscible with the analyte solution 302, the sensing solution 304 including a chemical indicator responsive to the chemical species.

It should be understood that the term "analyte solution" refers to a liquid in which a chemical species (or chemical substance) to be detected is solubilized. In some embodiments, the analyte solution 302 can be an aqueous solution and the chemical species can be an ion (cation or anion) or a molecule soluble in the aqueous solution 302. For example, the analyte solution 302 can include (without being limited to) water from a retention pond, water from a tailings pond, water from an anaerobic digester, water from a sewage treatment plant, water from hydroponic cultures, industrial wastewater, blood, urine or plasma. In other embodiments, the analyte solution 302 can be a solvent (e.g. an organic solvent) or a mixture of solvents and the chemical species is an ion or a molecule soluble in the solvent or mixture of solvents. In some scenarios, the pH of the analyte solution 302 can range from 3 to 11. In some embodiments, a pH buffer can initially be present in the analyte solution 302 or can be added to the analyte solution 302 prior to contacting it with the sensing solution 304.

It should be understood that the term "sensing solution" refers to a liquid in which the chemical indicator is solubilized. It should also be understood that in the context of the present description, the term "sensing solution" excludes polymers such as thermoplastic polymers which may be typically used as materials for forming chemical sensors such as polymer-based optodes. In other words, the sensing solution is a liquid which can flow in a container or conduit (e.g., a microfluidic channel). For example, the sensing solution may have a viscosity of $10^{-3}$ Pa·s or lower. It should also be understood that the implementations described herein relate to a sensing solution and an analyte solution that are liquid, but gaseous segments of analyte and sensing materials can be generated and used in a similar fashion in other implementations.

As mentioned above, the sensing solution 304 is immiscible with the analyte solution 302. By "immiscible", it is meant that the analyte solution 302 and the sensing solution 304 cannot undergo mixing or blending to form a homogeneous substance. It is however understood that traces of the analyte solution 302 can be soluble in the sensing solution 304, and conversely. It is also understood that the analyte solution 302 and the sensing solution 304 can form an emulsion under certain circumstances. In some embodiments, the sensing solution 304 is selected depending on the nature of the analyte solution 302. In some embodiments, if the analyte solution 302 is an aqueous solution, the sensing solution 304 can be selected to be a solvent (e.g. an organic solvent) or a mixture of solvents immiscible with the aqueous solution. For example, the organic solvent can include (without being limited to) chloroform, carbon tetrachloride, butyl acetate, 1-octanol, tetradecane, a linoleate oil, a silicone oil, or a mixture thereof. The selection of the solvent (or mixture of solvents) forming the sensing solution may depend on certain chemical properties of the solvent. Such chemical properties can include, for example, but without being limited to, the hydrophobicity of the solvent, the capability to solubilize the chemical indicator, and the partitioning equilibrium with the analyte solution. The solvent can also be chosen depending on certain physical properties such as the transparency in a given spectral region which may be used for detecting the response of the chemical indicator. For example, carbon tetrachloride can be chosen as the solvent if the response is to be detected in the mid-IR (mid-infrared) region, since it features few absorption bands in the mid-IR region compared to other common organic solvents (such as ethyl-acetate for example). The solvent can also be chosen depending on certain environmental or legal restrictions which may be specific to the jurisdiction where the methods or the systems of the present description can be implemented or used. In other embodiments, if the analyte solution 302 is an organic solvent, the sensing solution 304 can be selected to be an aqueous solution immiscible with the organic solvent.

The sensing solution 304 includes a chemical indicator which is responsive to the chemical species to be detected in the analyte solution 302. It should be understood that the expression "responsive to the chemical species" means that the chemical indicator provides a response which depends on the presence or absence of the chemical species in the analyte solution 302, or which depends on the concentration of the chemical species in the analyte solution 302. The chemical indicator can directly or indirectly provide the response to a given chemical species or to several chemical species. Direct sensitivity (or direct detection) refers to a chemical indicator which is directly in a chemical equilibrium with the analyte. An example of a direct detection is a pH indicator for sensing protons solvated in a solution. Indirect sensitivity (or indirect detection) refers to equilibrium between the chemical indicator and the analyte which is carried out by several chemical equilibriums between other chemical intermediates, as detailed below. An example of indirect sensitivity can be the indirect detection of sodium ions or calcium ions solvated in a solution. It should also be understood that the response can be an optical response or can be another type of response. The types of responses which may be used with the methods and systems of the present description will be described in further detail herein.

Figure 2:
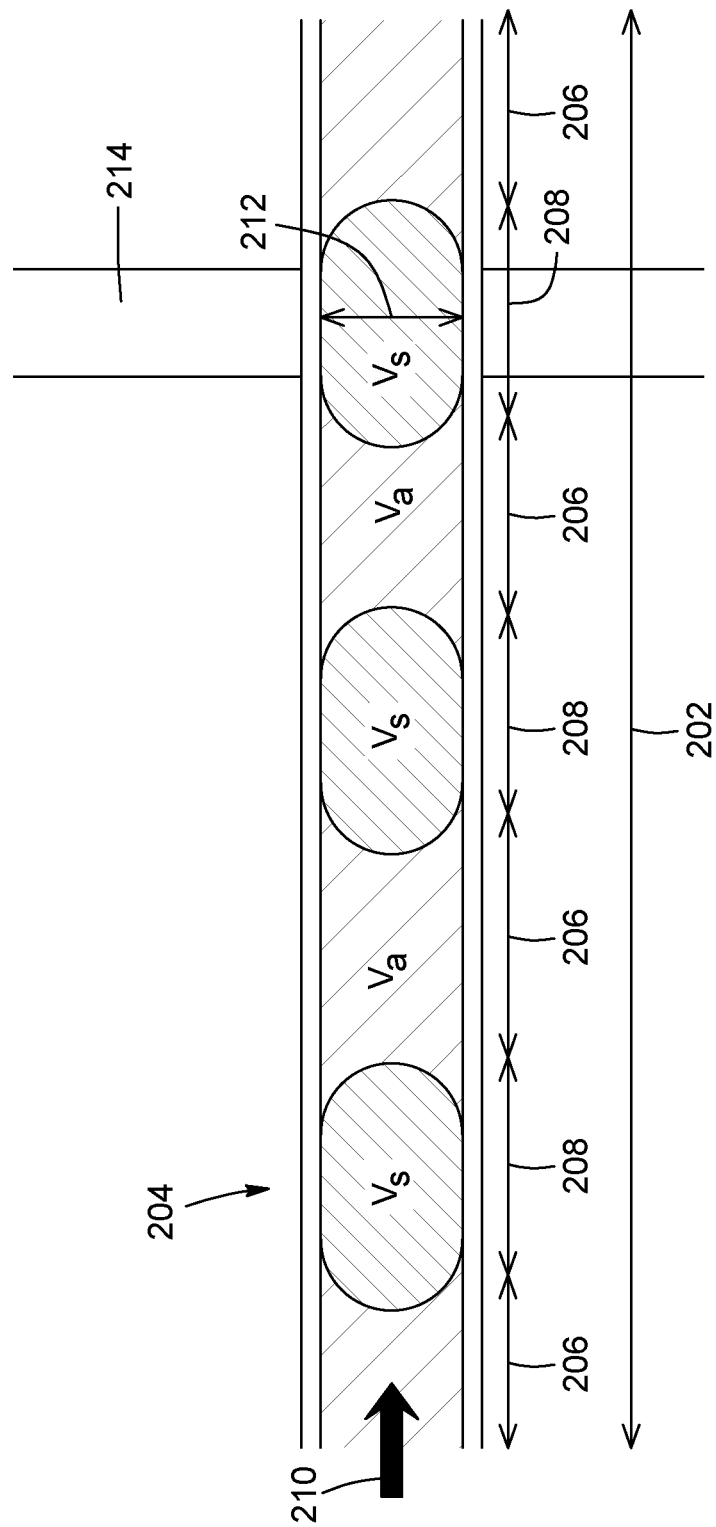
FIG. 2 is a cross-sectional view of a microfluidic channel including segments of analyte solution and segments of sensing solution in surface contact with each other, according to an embodiment.

Referring to both FIGS. 2 and 3, the method 300 also includes injecting 306 at least one train of segments 202 into a microfluidic channel 204. Each train of segments 202 includes segments of analyte solution 206 and segments of sensing solution 208, with each segment of analyte solution 206 being in surface contact with at least one contacting segment of sensing solution 208. Furthermore, in each train of segments 202, each segment of analyte solution 206 has a volume Va, and each segment of sensing solution has a volume Vs, thereby defining each train of segments by a ratio r=Vs/Va. For example, in some scenarios, r can range from 0.01 to 100, or from 0.1 to 10.

It should be understood that the term "segment", as used herein, refers to a discrete amount of liquid provided in the microfluidic channel. The length of the segments can vary and can depend on the desired segment volume and on the width, depth and/or diameter of the microfluidic channel. In some embodiments, the segments of liquid present in the microfluidic channel can be referred to as droplets of liquid. It should therefore be understood that in some embodiments, the terms "segment of analyte solution" and "segment of sensing solution" may be referred to as "droplet of analyte solution" and "droplet of sensing solution". It should also be understood that the term "segments" can also refer to "plugs" or "slugs" of solution. The segments of analyte solution and segments of sensing solution can for example each independently have a length ranging from 10 μm to 10 mm, and a width equal to the internal diameter (or depth/width) of the microfluidic channel into which they are being injected.

It should be understood that the expression "train of segments", as used herein, refers to a line of segments of analyte solution and sensing solution which can flow unidirectionally 210 in the microfluidic channel, from one end of the microfluidic channel towards a second end of the microfluidic channel. It should also be understood that each segment of analyte solution and each segment of sensing solution within a train of segments fills a cross-section (an example of a cross-section is shown as 212 on FIG. 2) of the microfluidic channel 204 (i.e., that each segment of analyte solution and each segment of sensing solution within a train of segments is in contact with the internal walls of the microfluidic channel, at least along a cross-section). Each given segment of analyte solution is not in direct contact with other segments of analyte solution, and each given segment of sensing solution is not in direct contact with other segments of sensing solution. The segments of sensing solution and segments of analyte solution can therefore flow in the microfluidic channel as confined segments generated in a squeezing regime by cross-flowing streams in the microchannel. It is understood that the segments can be generated by any suitable means, as known by a person skilled in the art. For example, a "pinched configuration" can be used, where a fluid is provided from two channels that pinch the fluid at a junction in order to obtain the segments.

In some embodiments, the train of segments has a predetermined number of segments. In other words, the injection system can be set to inject a predetermined number of droplets of each of the analyte solution and the sensing solution in a desired configuration. In some scenarios, the predetermined number can be between 4 and one or several hundred segments, such as between 4 and 100 segments. In some embodiments, the train of segments has equal numbers of segments of analyte solution and segments of sensing solution. In some embodiments, a surfactant can be added to the sensing solution for enhancing the stability of the segments of sensing solution in the microfluidic channel. In some embodiments, the internal walls of the microfluidic channel are adapted to the solutions used, and can be either hydrophilic or hydrophobic.

It should also be understood that the microfluidic channel into which the segments of sensing solution and segments of analyte solution can be injected is such that at least one dimension (i.e., the internal diameter, width, and/or depth) of the microfluidic channel ranges from a micrometer and tens of micrometers. For example, the microfluidic channel can have a diameter between 10 μm and 1000 μm, and a length between 100 μm and 10 cm. The microfluidic channel can have a cross-section which is square or rectangle-shaped, or its cross-section can have a circular or oblong shape. In some embodiments, the microfluidic channel can be made of plastic, glass, silica or a combination thereof. It is understood that the plastic selected to form the microfluidic channel should not react with any of the solvents present in the analyte and/or sensing solutions.

In the embodiment shown on FIG. 2, each segment of sensing solution 208 is in surface contact with two contacting segments of analyte solution 206, and each segment of analyte solution 206 is in surface contact with two contacting segments of sensing solution 208 (except for end segments of the train of segments). Such configuration may be referred to as an intercalated configuration, wherein each segment of analyte solution 206 is intercalated between two contacting segments of sensing solution 208, and each segment of sensing solution 208 is intercalated between two contacting segments of analyte solution 206. It should be understood that other configurations are possible, and that the methods and systems of the present description may be implemented with trains of segments configured such that each segment of analyte solution is in surface contact with one—or at least one—contacting segment of sensing solution. Such alternate configurations will be described in further detail herein with reference to FIGS. 7A to 7E.

Still referring to FIGS. 2 and 3, the illustrated method further includes circulating 308 the at least one train of segments in the microfluidic channel 204 (such as from a first end to a second end of the microfluidic channel), such that a reversible chemical exchange is established between the chemical species of each segment of analyte solution 206 and the chemical indicator of the at least one contacting segment of sensing solution 208.

In some embodiments, the circulating 308 of the train of segments 202 makes use of passive fluid control techniques such as capillary forces. In some embodiments, external actuation means can be used as a standalone means or in conjunction with capillary forces. For example, devices such as rotary drives, micropumps, syringe pumps, pressure controllers, peristaltic pumps, recirculation pumps and/or microvalves may be used for circulating the train of segments 202 in the microfluidic channel 204.

It should be understood that the expression "reversible chemical exchange", as used herein, refers to a chemical equilibrium process and excludes chemical reactions which irreversibly transform a reactant in a product. The chemical species to be detected, and present in each segment of analyte solution, is able to migrate (or to be transported) into the contacting segment(s) of sensing solution. In some scenarios, the transport of the chemical species into the sensing solution can occur via diffusion and is driven by the chemical equilibrium between the chemical species of the segment of analyte solution and the chemical indicator of the contacting segment(s) of sensing solution. In some embodiments, the train of segments can be transported in the microfluidic channel under turbulent conditions. In some scenarios, the addition of turbulence may accelerate the transfer of matter between the segments of analyte solution and the segments of sensing solution. Examples of reversible chemical equilibriums which may be used in the methods and systems of the present description will be described in further detail below. In some embodiments, mixing can be added to shorten the time delay in reaching the equilibrium. A non-limiting example of mixing strategy is to use a serpentine-shaped microchannel, or a series of serpentines along the microchannel. Other non-limiting examples of mixing techniques in microreactors are described in Song H., Tice J. D., Ismagilov R. F., Angew. Chem., 2003, 115, 792-796 and Angew. Chem. Int. Ed., 2003, 42, 768-722, which are hereby incorporated by reference in their entirety.

Still referring to FIGS. 2 and 3, in some embodiments, the method further includes measuring 310 a response of the chemical indicator. The response of the chemical indicator can be measured after the reversible chemical exchange is established (i.e., after the train of segments has sufficiently circulated in the microfluidic channel 204), for example at a second end of the microfluidic channel 204. In some scenarios, the reversible chemical exchange reaches an equilibrium state (i.e., a steady state) prior to or as the measurement is performed. However, it is understood that as long as the initial state (i.e., the initial concentrations of chemical indicator and ratio r of the train of segments) is known, the equilibrium state is not required for performing the measurement. In the case of an optical response, a beam of light 214 can pass through the microfluidic channel and prior to reaching an optical detector for analysis. It should be understood that the expressions "first end" and "second end" of the microfluidic channel are intended to refer, respectively, to the point at which the segments of analyte and sensing solutions are injected into the microfluidic channel and the point at which the measurement is performed. It should also be understood that the second end (i.e., the point of measurement) can be selected based on the properties of the reversible chemical exchange and the travel length required to get a state where enough molecular diffusion has taken place.

In some embodiments, the method further includes detecting or determining 312 the concentration of the chemical species in the analyte solution. Based on the response measured, a qualitative or numerical analysis may be performed in order to detect the chemical species or to determine its concentration in the analyte solution. In some embodiments, the concentration to be determined is the initial concentration $Ca_0$ of the chemical species in the analyte solution. In other embodiments, the concentration to be determined is the equilibrium concentration $C_{eq}$ of the chemical species in the analyte solution. It should be understood that when only a detection of a chemical species is required, the step of determining the concentration of the chemical species can take the form of a binary response (i.e., the chemical species is or is not present). It should also be understood that when the detection of the chemical species is to include a calculation or estimation of the concentration of the chemical species, the step of determining the concentration can include a numerical or computational determination of the concentration.

Still referring to FIGS. 2 and 3, in some embodiments, the method 300 can include the following steps:

a. providing a sensing solution 304 immiscible with the analyte solution 302, the sensing solution 304 including a chemical indicator responsive to the chemical species;
b. injecting 306 at least one train of segments 202 into a microfluidic channel 204 having a first end and a second end, each of the at least one train of segments 202 including:
  i. segments of analyte solution 206 having a volume Va; and
  ii. segments of sensing solution 208 having a volume Vs, wherein each of the at least one train of segments 202 is characterized by a ratio r=Vs/Va, each segment of analyte solution 206 being in surface contact with at least one contacting segment of sensing solution 208;
c. circulating 308 the at least one train of segments 202 from the first end to the second end of the microfluidic channel 204 such that a reversible chemical exchange is established between the chemical species of each segment of analyte solution 206 and the chemical indicator of the at least one contacting segment of sensing solution 208;
d. measuring 310 a response of the chemical indicator at the second end of the microfluidic channel 204; and
e. determining 312 the concentration of the chemical species in the analyte solution 302 based on the response.

Still referring to FIGS. 2 and 3, in some embodiments, the method 300 can include the injection of a plurality of trains of segments, each being characterized by a ratio r=Vs/Va. In some embodiments, the method 300 can include the following steps:

a. providing a sensing solution 304 immiscible with the analyte solution 302, the sensing solution 304 including a chemical indicator responsive to the chemical species;
b. injecting 306 trains of segments 202 into a microfluidic channel 204 having a first end and a second end, each train of segments 202 including:
  i. segments of analyte solution 206, each having a volume Va; and
  ii. segments of sensing solution 208, each having a volume Vs, each segment of analyte solution 206 being in surface contact with at least one contacting segment of sensing solution 208, each train of segments being defined by a ratio r=Vs/Va;
c. circulating 308 each train of segments 202 from the first end to the second end of the microfluidic channel 204, such that a reversible chemical exchange is established between the chemical species of each segment of analyte solution 206 and the chemical indicator of the at least one contacting segment of sensing solution 208;
d. measuring 310 a response of the chemical indicator at the second end of the microfluidic channel for each train of segments, thereby obtaining a set of responses of the chemical indicator as a function of the ratio r; and
e. determining 312 the concentration of the chemical species in the analyte solution 302 based on the set of responses.

Figure 4:
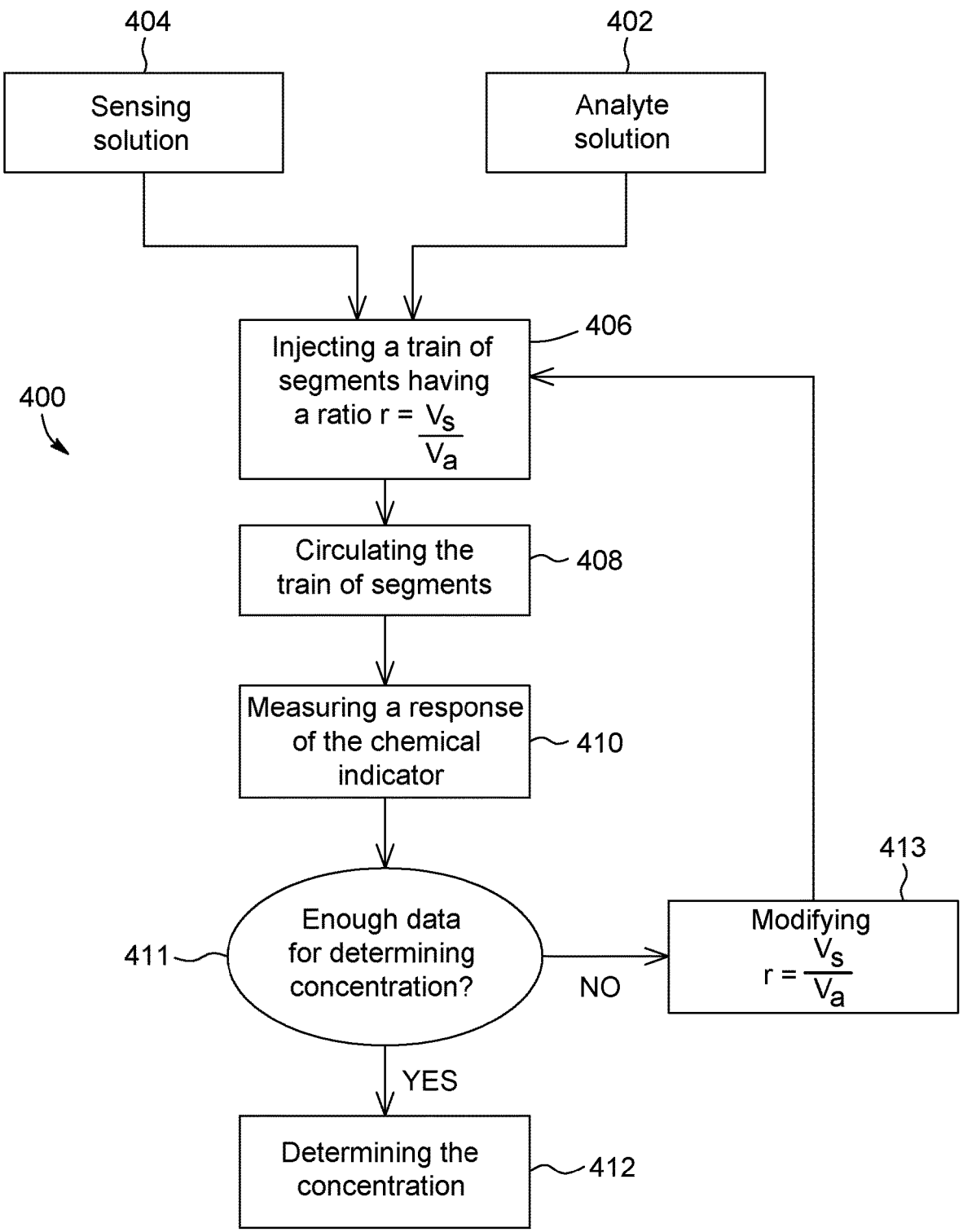
FIG. 4 is a process flow diagram of a method for measuring the concentration of a chemical species in solution, according to another embodiment.

Now referring to FIGS. 2 and 4, another method 400 for detecting or measuring the concentration of a chemical species in an analyte solution 402 is provided. The method 400 includes:

a. providing a sensing solution 404 immiscible with the analyte solution 402, the sensing solution 404 including a chemical indicator responsive to the chemical species;
b. injecting 406 a train of segments 202 into a microfluidic channel 204 having a first end and a second end, the train of segments 202 including:
  i. segments of analyte solution 206, each having a volume Va; and ii. segments of sensing solution 208, each having a volume Vs, each segment of analyte solution 206 being in surface contact with at least one contacting segment of sensing solution 208, each train of segments being defined by a ratio r=Vs/Va;

c. circulating 408 the train of segments 202 from the first end to the second end of the microfluidic channel, such that a reversible chemical exchange is established between the chemical species of each segment of analyte solution 206 and the chemical indicator of the at least one contacting segment of sensing solution 208;

d. measuring 410 a response of the chemical indicator at the second end of the microfluidic channel 204;

e. assessing 411 if enough data is available for determining the concentration of the chemical species in the analyte solution 206;

f. if step e) results in more data being required, then the method further includes modifying 413 the ratio r and repeating steps a) to e) thereby obtaining a set of responses of the chemical indicator as a function of the ratio r; and g. if step e) results in enough data being available, then the method further includes determining 412 the concentration of the chemical species in the analyte solution 402 based on the set of responses.

In some embodiments, the ratio r=Vs/Va is modified by keeping Vs constant and modifying Va. In some embodiments, the ratio r=Vs/Va is modified by keeping Va constant and modifying Vs. In some scenarios, Va and Vs can each independently be from 100 pl to 10 µl. It should be understood that the possibility of attaining certain values of r may depend on several factors, such as the viscosity of the liquids, the geometry of the microchannel, the flow rate of the liquids, etc.

In some scenarios, the ratio r=Vs/Va can be used as a parameter for determining the concentration of the chemical species in the analyte solution. In some scenarios, measuring the response for each value of the ratio r can also allow for determining the concentration of the chemical species in the analyte solution without the need for chemically calibrating the system when the analyte solution is sufficiently buffered (i.e., at pH substantially constant, without the need for conducting measurements on standard solutions of known concentrations).

As mentioned above, the train of segments can be injected into the microfluidic channel in a number of configurations, such as the configurations shown on FIGS. 7A to 7E. It should be understood that such configurations are illustrative and that other configurations may be used. It should also be understood that the Vs/Va ratios shown on the Figures are illustrative only, and are not meant to be scaled representations. The direction of flow is shown at 210 on FIGS. 7A to 7E.

Now referring to FIG. 7A, a train of segments in an intercalated configuration is shown, as can be seen on FIG. 2. The train of segments includes segments of analyte solution 206 and segments of sensing solution 208 and has a volumetric ratio r of about 2/3.

Now referring to FIG. 7B, the train of segment includes sets of segments 209, with each set of segments 209 including one segment of analyte solution 206 in contact with one segment of sensing solution 208. The sets of segments 209 are separated from one another by segments of carrier fluid 207 which is immiscible with the analyte solution and the sensing solution. The train of segments shown has a volumetric ratio r of about 2/3.

Now referring to FIG. 7C, the train of segment includes sets of segments 209, with each set of segments 209 including one segment of analyte solution 206 in contact with two segments of sensing solution 208. The sets of segments 209 are separated from one another by segments of carrier fluid 207 which is at least immiscible with the sensing solution. The train of segments shown has a volumetric ratio r of about 4/3.

Now referring to FIG. 7D, the train of segment includes sets of segments 209, with each set of segments 209 including one segment of sensing solution 208 in contact with two segments of analyte solution 206. The sets of segments 209 are separated from one another by segments of carrier fluid 207 which is at least immiscible with the analyte solution. The train of segments shown has a volumetric ratio r of about 1/3.

Referring to FIGS. 7B to 7D, in some embodiments, the at least one train of segments includes sets of segments, each set of segments including at least one segment of analyte solution in surface contact with at least one segment of sensing solution, the sets of segments being separated from one another by a carrier fluid immiscible with the analyte solution and/or the sensing solution depending on the segments in contact with the carrier fluid (i.e., the carrier fluid is chosen such that it is immiscible with the contacting segments). In some embodiments, the carrier fluid can be a gas, and may include air, nitrogen and/or argon. In some embodiments, the carrier fluid includes a solvent.

Now referring to FIG. 7E, several trains of segments 202a, 202b, 202c run in parallel in separate microfluidic channels. Each train of segments has a set volumetric ratio. In the embodiment shown, the train of segments 202a has a volumetric ratio r of about 2/3; the train of segments 202b has a volumetric ratio r of about 1/4; and the train of segments 202c has a volumetric ratio r of about 1. The trains of segments 202a, 202b, 202c can be passed simultaneously through three detectors in order to obtain the set of responses depending on the ratio r simultaneously, as opposed to sequentially. Such a configuration requires as many detectors as the number of simultaneous measurements, or a detector requiring demultiplexing of the responses of the various microchannels. This configuration may have the advantage of requiring less time for obtaining the measurements.

In some embodiments, the method can further include exposing the segments of sensing solution to the analyte solution prior to injecting the train of segments into the microfluidic channel. For example, small volumes of sensing solution can be exposed to a larger volume of the analyte solution such that the ratio volume of sensing solution/volume of analyte solution is close to zero (i.e., equivalent to using a ratio r close to zero). This configuration can allow to not substantially affecting the analyte solution, even while equilibrium is reached between the analyte solution and the sensing solution, which can be desirable in some scenarios.

In some embodiments, the method can further include regenerating the segments of sensing solution at the second end of the microfluidic channel, after the step of measuring the response. The regenerated segments of sensing solution can be re-used as part of another train of segments at the first end of the microfluidic channel, or can be stored for later use. In some embodiments, the regeneration can include purification steps to remove the chemical species from the sensing solution and restore the chemical indicator to its initial state. In some embodiments, the regeneration can include exposing the sensing solution to an acidic solution.

In some scenarios, exposing the sensing solution to an acidic solution can allow driving the chemical species out of the sensing solution.

In some embodiments, the method can further include conditioning the analyte solution prior to injecting the analyte solution into the microfluidic channel. For example, the conditioning can include removing bulky particles from the analyte, buffering the analyte solution and/or selectively removing certain components which are known to interfere with the chemical exchange.

In some embodiments, the sensing solution is free of the chemical species prior to injecting the sensing solution into the microfluidic channel. In other embodiments, the sensing solution is saturated with the chemical species prior to injecting the sensing solution into the microfluidic channel.

Implementations of the System

Figure 1:
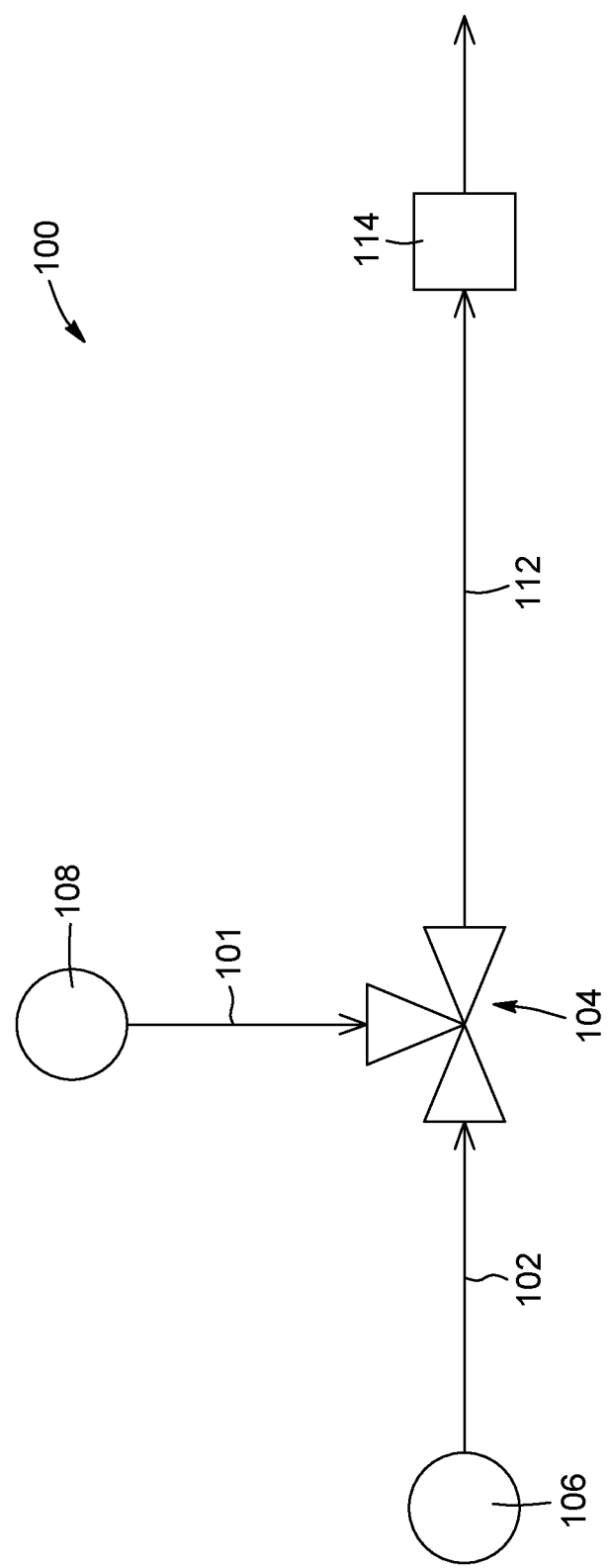
FIG. 1 is a schematic representation of a detection system according to an embodiment.
Figure 6:
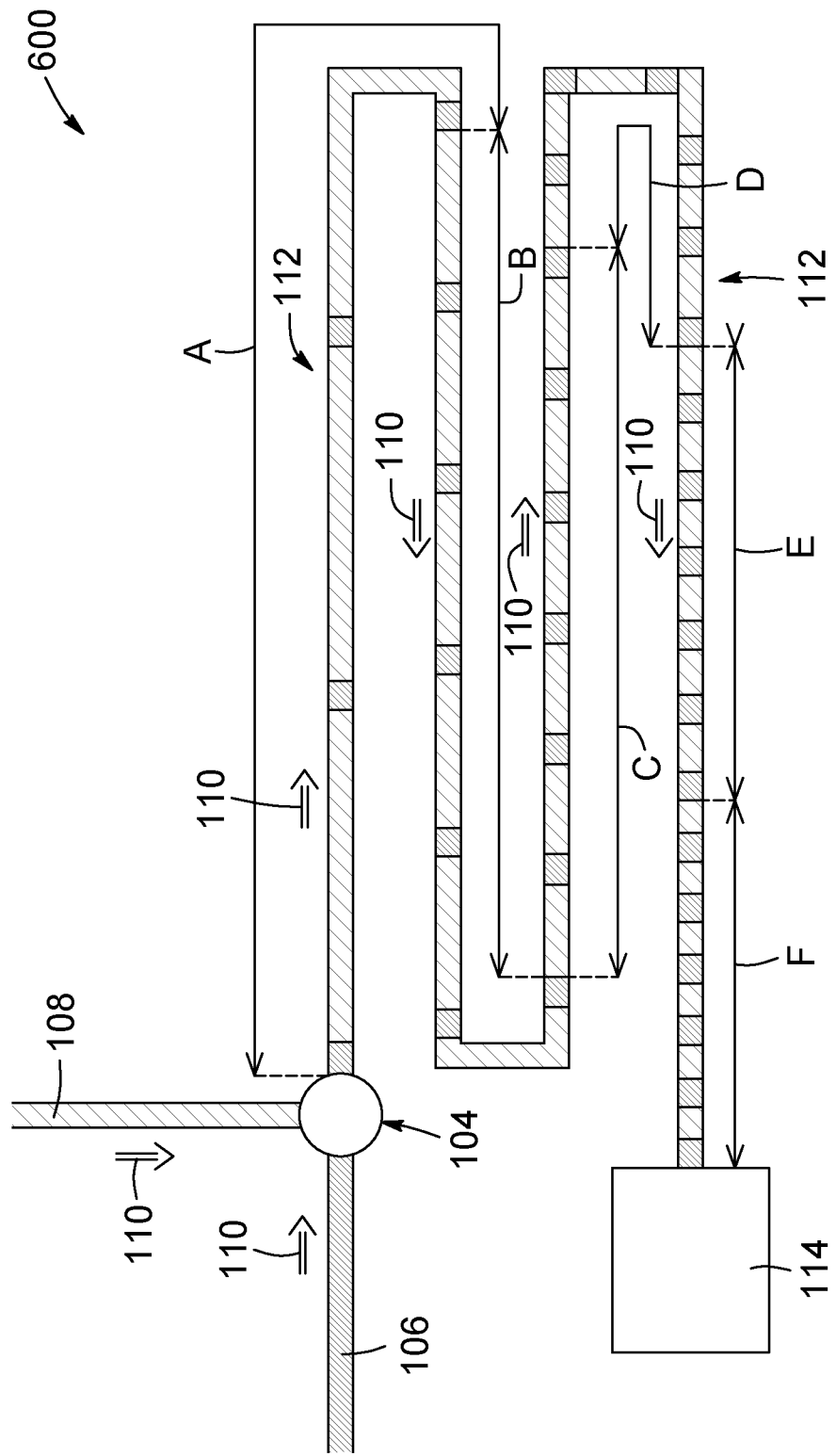
FIG. 6 is a schematic representation of a detection system according to another embodiment, wherein the microfluidic channel includes several trains of segments having different volumetric ratios r.

Now referring to FIGS. 1 and 6, systems 100 and 600 are provided for implementing the methods described herein. In some embodiments, an analyte solution 106 including a chemical species to be detected can be supplied to a flow control device 104 via transfer line 102, and a sensing solution 108 including a chemical indicator responsive to the chemical species can be supplied to the flow control device 104 via transfer line 101.

In some embodiments, the flow control device 104 is configured to generate segments of analyte solution and segments of sensing solution. The flow control device 104 can also be configured to inject the segments of analyte solution and segments of sensing solution into a first end of an equilibration line 112 in a desired configuration (for example as explained above with reference to FIGS. 2 and 7A-7E). It is understood that the equilibration line 112 (or equilibration path 112) can be embodied by a microfluidic channel and that the chemical exchange is established along the equilibration line 112. It is also understood that transfer lines 101 and 102 can be any type of transfer means such as tubing, piping etc., and do not necessarily need to enable microfluidic flow therein.

It is also understood that the flow control device 104 can include any flow control means that can allow for the injection of the train of segments in the equilibration line 112, and can for example include micro-components such as micro-pumps and/or micro valves. In some embodiments, the flow control device 104 can include a three-way valve. In some embodiments, the flow control device 104 can include a microfluidic chip such as a T-junction or a pinched junction, and one or several pressure controllers. The flow control device 104 can allow for the formation of segments of analyte solution and segments of sensing solution that fill a cross-section of the microfluidic channel, as explained above.

The sensing solution and the analyte solution can be provided to the flow control device 104 using respective sensing solution injector and analyte solution injector. It is understood that when a carrier fluid is used, a third injector can be used (on top of the analyte solution injector and the sensing solution injector) in order to convey the carrier fluid to the flow control device 104.

In some embodiments, a detector 114 is provided at a second end of the equilibration line 112. In some scenarios, an equilibrium state is reached by the time the segments reach the detector 114. The detector 114 can be any type of detector which is able to measure the response of the chemical indicator. In some embodiments, the detector can be a multiplex detector.

The sensing solution 108 can be conveyed to the flow control device 104 from a reservoir (not shown). The reservoir can have a small volume, depending on the dimension of the microfluidic channel. For example, if the microfluidic channel has an internal diameter of about 100 µm, a reservoir volume of 1 mL can allow performing more than 200,000 measurements for segments of sensing solution having a length varying from 100 to 1000 µm.

Now referring to FIG. 6, a system 600 is shown in operation with several trains of segments, each having a given ratio r, illustrated in the microfluidic channel 112. The direction of flow is shown at 110 on FIG. 6. The trains of segments A, B, C, D, E and F shown in the microfluidic channel 112 have the following ratios Vs/Va:

A: $r=10$;
B: $r=5$;
C: $r=3$;
D: $r=2$;
E: $r=3/2$; and
F: $r=1$.

Each one of the train of segments B to F of FIG. 6 consists of 6 segments of analyte solution and 6 segments of sensing solution. The train of segment A consists of 3 segments of analyte solution and 3 segments of sensing solution. It is understood that the trains of segments shown on FIG. 6 are illustrative only, and that other configurations are possible. For example, the number of segments and the ratio r of each train of segments can vary. In the embodiment of FIG. 6, the trains of segments are continuously injected into the microfluidic channel 112 such that each train of segments contacts the following and preceding train of segments. However, it should be understood that in some embodiments, the trains of segments can be injected in a non-continuous manner. In other words, the trains of segments can each be injected separately from each other and do not need to be in contact with one another. In some embodiments, the time between the injection of each train of segments can also vary and can range from several seconds to several hours or days.

In some embodiments, the system of FIGS. 1 and 6 can be connected to a control unit (not shown). In some embodiments, the control unit can control the flows of the sensing solution and the analyte solution, as well as the volumetric ratio r. In some embodiments, the volumetric ratio r can be controlled by varying the relative flows of the sensing solution and the analyte solution. In some embodiments, the control unit can collect data from the detector 114, and may perform automated data processing for deriving the concentration of the chemical species to be detected and/or the pH of the analyte solution. The data processing can include the use of the equations described further below. In some embodiments, the detector 114 is connected to the controller unit via a feedback loop.

Implementations of the Chemical Species and Chemical Indicator

As described above, the chemical species to be detected can be an ion (cation or anion) or a molecule (which is solubilized in the analyte solution). For example, the chemical species can include protons, cations such as alkali ions, alkali-earth ions, or transition metal ions, or anions such as halogen ions, polyatomic ions and organic ions. The chemical species can also include small organic molecules or water-soluble molecules. The chemical indicator (and, by extension, the type of chemical response induced by the chemical exchange) can be selected depending on the chemical species to be detected.

In some embodiments, the chemical indicator provides an optical response which can vary with the concentration of the chemical species in the sensing solution. The chemical indicator can directly or indirectly provide the optical response to a given chemical species. In some embodiments, the optical response includes a change in the perceivable color of the segments of sensing solution upon exposure to the chemical species. In some embodiments, the optical response includes a change in the optical absorption, optical transmission, reflection, Raman and/or fluorescence spectrum of the segments of sensing solution upon exposure to the chemical species. It is understood that measuring the optical response can include measuring at least one of a UV-visible spectrum (e.g., at wavelengths between about 180 nm and 600 nm), an IR spectrum (e.g., at wavelengths between about 0.8 µm to 2.5 µm, 2.5 µm to 25 µm or 25 µm to 1000 µm), a fluorescence spectrum and a Raman spectrum. It is also understood that the optical response can be measured at several of the wavelengths mentioned herein (i.e., a combination of discrete wavelengths or ranges of wavelengths). Other optical measurement techniques which can be used may for example include fluorescence lifetime spectroscopy, polarisation measurements of chiral compounds, measurements using a Fabry-Perot interferometer, etc. In some embodiments, the nature of the response may differ from an optical response. For example, the response can be an NMR chemical shift or a differential of electrical potential or conductivity.

It is understood that the term "optical response", as used herein, may refer to changes in the interaction of the sensing solution with light as a result of the presence of the chemical species transported from the analyte solution. This optical response can therefore be monitored by observing or measuring the spectral properties of the sensing solution. In some applications, such a monitoring can provide a qualitative indication of the presence of the chemical species within the sensing solution. For example, the presence of the chemical species may alter the perceived color of the sensing solution. By way of example, a sodium-sensitive sensing solution may appear blue when contacted with a sodium-free solution, and may appear purple when contacted with a solution containing a sufficient concentration of NaCl. In other embodiments, a change in refractive index, and/or in the optical absorption, transmission and/or the reflection or emission spectrum of the sensing solution may be induced upon exposure to the chemical species. Such a change may be detected by using known techniques, based for example on absorption spectroscopy or reflectance spectroscopy.

In some embodiments, the chemical species is an ionic species (i.e., an anion or a cation) and the reversible chemical exchange is a reversible ionic exchange. In some embodiments, the chemical indicator can include:

an ionic additive R for providing electroneutrality to the sensing solution;
an ion-selective ionophore L able to reversibly bind the ionic species; and
a chromoionophore C for providing the response of the chemical indicator based on the binding of the ionic species and the ion-selective ionophore.

In some embodiments, the chemical indicator includes an ionic additive (or ionic sites) R when the chemical species to be detected is an ion. The ionic additive provides electroneutrality by ensuring charge conservation in the sensing solution. The ionic additive R can be selected to have a bulky anion or cation which can remain in the sensing solution.

In some embodiments, when the chemical species to be detected is a cation, the ionic additive can include a bulky anion or a weakly coordinating anion, such as tetrakis[3,5-bis(trifluoro)phenyl]borate, hexafluorophosphate, tetrafluoroborate, perchlorate $Al(OC(CF_3)_3)_4^-$, or $B(C_6F_5)_3^-$, tetrakis[3,5-bis(1,1,1,3,3,3-hexafluoro-2-methoxy-2-propyl) phenyl]borate trihydrate, tetrakis(4-chlorophenyl)borate, tetrakis(4-tert-butylphenyl)borate, tetra(p-tolyl)borate, tetraphenylborate, tetraphenylborate, tetrakis[3,5-bis(tridecafluorohexyl)phenyl]borate or a mixture thereof. Examples of ionic additives include sodium, potassium, calcium salts of the anions mentioned above. Other examples of ionic additives can include potassium tetrakis[3,5-bis(trifluoromethyl)phenyl]borate, sodium tetrakis[3,5-bis(trifluoromethyl)phenyl]borate, potassium tetrakis(4-chlorophenyl)borate, potassium tetrakis(4-biphenylyl)borate, Potassium tetrakis(4-tert-butylphenyl)borate, sodium tetra(p-tolyl)borate, sodium tetraphenylborate, tetradodecyl ammonium tetrakis(4-chlorophenyl)borate, tridodecylmethylammonium chloride, tetraoctylammonium bromide, tetraoctadecylammonium bromide, hexadecyltrimethylammonium bromide, tridodecylmethylammonium nitrate, or a mixture thereof.

In some embodiments, the chemical indicator includes a chromoionophore C which can provide the optical response of the sensing solution. It is to be noted that the chromoionophore C can be omitted in the instance that the chemical species to be detected can provide an optical response by itself. In some embodiments, the chemical indicator includes an ion-selective ionophore L which can provide chemical selectivity.

In some embodiments, the chromoionophore C can include choromoionophore-I™, choromoionophore-II™, choromoionophore-III™, choromoionophore-IV™, choromoionophore-V™, choromoionophore-VI™, choromoionophore-VII™, choromoionophore-VIII™, choromoionophore-IX™, choromoionophore-X™, choromoionophore-XI™ or choromoionophore-XVII™.

In some embodiments, the ion-selective ionophore L can be selected such that it can complex the targeted ion with a binding constant which is several thousand times higher than the binding constants between the ion-selective ionophore L and other species present in the medium. In other words, the sensing solution can be used as an ion-specific sensor for the specific detection of a chemical species having a higher affinity with the ion-selective ionophore L compared to other species that can be present. The ion-selective ionophore L may therefore be selected to selectively bind the targeted ion over other ions or compounds present in the analyte solution and/or in the sensing solution.

In some embodiments, the ion-selective ionophore L can include aluminium ionophore-I™, ammonium ionophore-I™, cadmium ionophore-I™, calcium ionophore-I™, calcium ionophore-II™, -calcium ionophore-III™, calcium ionophore-IV™, calcium ionophore-V™, calcium ionophore-VI™, cerium(III) ionophore-I™, cesium ionophore-I™, cesium ionophore-II™, cesium ionophore-III™, chromium(III) ionophore-III™, chromium(IV) ionophore-III™, cobalt ionophore-IV™, copper(II) ionophore-I™, copper(II) ionophore-IV™, copper(II) ionophore-V™, erbium ionophore-IV™, hydrogen ionophore-I™, hydrogen ionophore-II™, hydrogen ionophore-III™, hydrogen ionophore-IV™, hydrogen ionophore-V™, Iron(III) ionophore-IV™, lead ionophore-I™, lead ionophore-II™, lead ionophore-III™, lead ionophore-IV™, lead ionophore-VII™, lithium ionophore-I™, lithium ionophore-II™, lithium ionophore-III™, lithium ionophore-IV™, lithium ionophore-VI™, lithium ionophore-VII™, lithium ionophore-VIII™, magnesium ionophore-I™, magnesium ionophore-II™, magnesium ionophore-III™, magnesium ionophore-IV™, magnesium ionophore-VI™, magnesium ionophore-VII™, mercury ionophore-I™, potassium ionophore-I™, potassium ionophore-II™, potassium ionophore-III™, potassium ionophore-IV™, rubidium ionophore-I™, samarium ionophore-I™, samarium ionophore-II™, silver ionophore-III™, silver ionophore-IV™, silver ionophore-VI™, silver ionophore-VII™, sodium ionophore-I™, sodium ionophore-II™, sodium ionophore-III™ sodium ionophore-IV™, sodium ionophore-V™, sodium ionophore-VI™, sodium ionophore-VIII™, sodium ionophore-X™, thulium ionophore-I™, tin ionophore-I™, uranyl ionophore-I™, ytterbium(III) ionophore-II™, zinc ionophore-I™, zirconium ionophore-I™, benzoate ionophore-I™, carbonate ionophore-VII™, chloride ionophore-I™, chloride ionophore-II™, chloride ionophore-III™, chloride ionophore-IV™, cyanide ionophore-II™, fluoride ionophore-I™, hydrogen sulfite ionophore-I™, iodide ionophore-I™, iodide ionophore-IV™, molybdate ionophore-I™, nitrate ionophore-III™, nitrate ionophore-V™, nitrate ionophore-VI™, nitrite ionophore-I™, nitrite ionophore-II™, perchlorate ionophore-I™, phtalate ionophore-I™, salicylate ionophore-I™, salicylate ionophore-II™, sulfate ionophore-I™, or amine ionophore-I™.

In some embodiments, the counterion of the ionic additive R can be exchanged (i.e., replaced) with a second counterion by conditioning of the sensing solution. The conditioning can for example include adding an ionic species including the second counterion to the sensing solution and removing the initial counterion (for example by extraction). In some scenarios, the conditioning can remove non lipophilic ions and replace them with organic ions such as an acidic chromoionophore.

In some embodiments in which the sensing solution aims at detecting ions (i.e. targeted ions), and in which the chemical indicator includes the chromoionophore C, the ion-selective ionophore L and the ionic additive R, the chemical indicator can allow for:
- the transport of the targeted ions from the analyte solution to the sensing solution;
- the complexation of the targeted ions by the ion-selective ionophore L in the sensing solution, the ion-selective ionophore L thereby releasing a stimulus as a result (e.g. a proton); and
- a change in the optical response of the sensing solution via a change of the chemical state of the chromoionophore C (e.g. the chromoionophore C can become protonated).

In some implementations, spectroscopy techniques may provide a quantitative indication of the concentration of the chemical species present in a solution. For example, a given chromoionophore may co-exist in the sensing solution in basic and acidic forms, the relative proportions of these forms being directly related to the concentration of targeted ions transported in the sensing solution, and therefore to the concentration of the targeted ions in the analyte solution. As chromoionophores in each form have an optical response characterized by a distinct spectral shape, the resulting spectral response of the sensing solution is typically a combination of these two distinct spectra weighted by the ratio of chromoionophores in basic and acidic forms. This ratio can be determined by analyzing the spectral response, and the concentration of targeted ions calculated using an equation describing the equilibrium between the chromoionophore C, ionophore L, ionic site R and targeted ion.

It will be readily understood that the optical response of the sensing solution may be measured in a variety of manners according to the requirements and preferences of specific applications. Such measuring may be quantitative or qualitative, manual or automatized, etc.

Monovalent Cation Implementations

In what follows and unless indicated otherwise, the detection of a monovalent cation having a stoichiometry of one (1) with a ion-selective ionophore is considered. The ion-selective ionophore alone is neutral and the protonated state of the chromoionophore has a charge of +1. It should be understood that this implementation is illustrative, and that it would be apparent to a person skilled in the art that other configurations are possible (e.g., detection of a monovalent anion, detection of an ion having a stoichiometry greater than one with the ion-selective ionophore). In some embodiments, the ionophore can be a charged ionophore.

Figure 5:
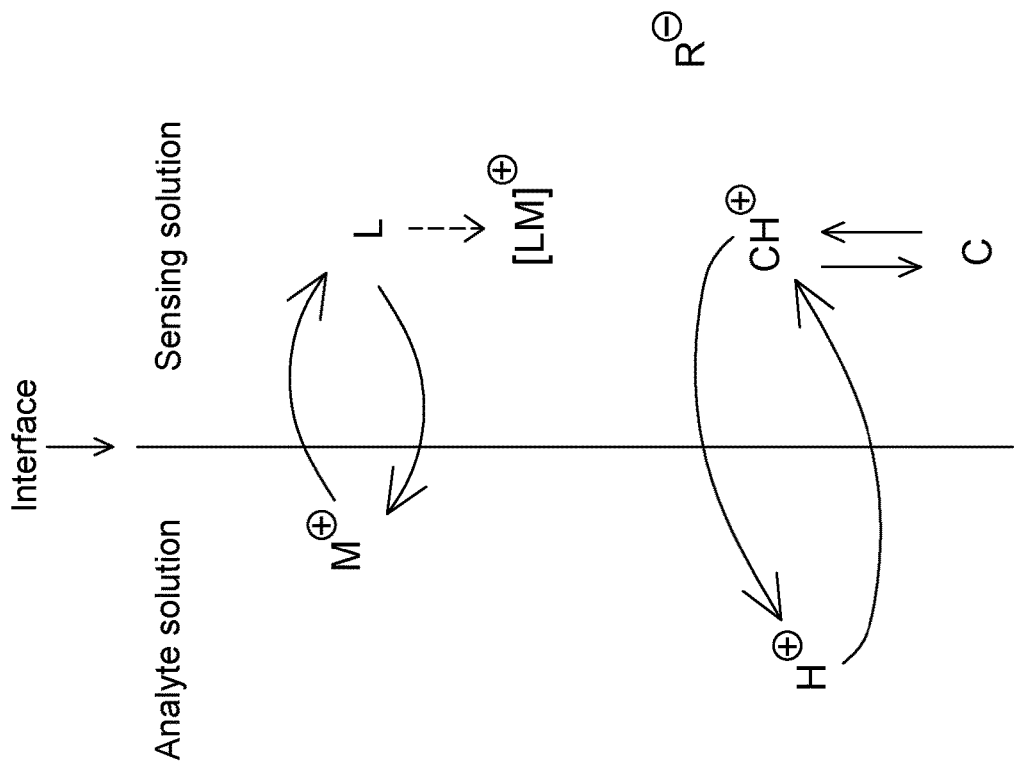
FIG. 5 is a schematic representation of a reversible ionic exchange between the analyte solution and the sensing solution, according to an embodiment, wherein the ion is a cation having a+1 charge.

In what follows, a sensing solution including a chemical indicator consisting of a chromoionophore C at a total concentration $C_T$, an ion-selective ionophore L at a total concentration $L_T$ and an ionic additive R at a total concentration $R_T$ is considered. Upon contacting the sensing solution with the analyte solution (which includes a monovalent cation $M^+$ to be detected), a reversible ionic exchange is established between the monovalent cation $M^+$ and the chemical indicator, for example as given by Equation 1 below and as shown on FIG. 5.

$$CH^+(s)+M^+(a)+L(s)+R^-(s) \rightleftharpoons C(s)+H^+(a)+ML^+(s)+R^-(s) \qquad \text{Equation 1}$$

In Equation 1, $ML^+$ is the ion-ligand complex having a stoichiometry of one, (s) means that the substance is in the sensing solution and (a), in the analyte solution. The overall chemical equilibrium constant is K. This ionic exchange directly affects the equilibrium between the two states of the chromoionophore, namely the protonated (acidic) state $CH^+$ and the deprotonated (basic) state C. Since $CH^+$ and C have different colors, a change in their relative concentrations can be quantified using spectroscopic techniques. The relative concentration of the deprotonated state is referred to as the degree of deprotonation or dissociation α and is given by Equation 2 below.

$$\alpha = \frac{[C]}{[CH^+]+[C]} \qquad \text{Equation 2}$$

The degree of deprotonation α is related to the concentration Ca of the targeted ion $M^+$ (or more specifically to the activity of the targeted ion $M^+$) in the analyte solution. This relation depends on the chemical equilibrium between the analyte solution and the sensing solution. For the example given in Equation 1, the concentration $C_a$ of the targeted ion $M^+$ and the degree of deprotonation α are related by Equation 3 below.

$$C_a = \frac{10^{-pH}}{K} \frac{\alpha}{1-\alpha} \frac{R_T - (1-\alpha)C_T}{L_T - [R_T - (1-\alpha)C_T]}, \qquad \text{Equation 3}$$

Referring to FIG. 2, the methods and systems of the present description can allow for the measurement of the degree of deprotonation α for each value of the volumetric ratio r=Vs/Va. In some scenarios, a plot of α as a function of r (i.e., α(r)) can be obtained and analyzed.

Before contacting the sensing solution, the concentration of the targeted ion $M^+$ in the analyte solution is noted $Ca_0$ (i.e., the initial concentration), and the initial pH of the analyte solution is noted $pH_0$. The initial concentration $Ca_0$ can be determined using the methods of the present description.

For example, for each train of segments having a volumetric ratio r, considering a sensing solution which does not contain any targeted ions $M^+$ before being contacted with the analyte solution, a first fraction of the targeted ions will migrate to the sensing solution and the remaining fraction of the targeted ions will remain in the analyte solution after an equilibrium is reached in the microfluidic channel. The initial concentration $Ca_0$ can be expressed as a function of Ca, r and the concentration Cs of $M^+$ in the sensing solution, as per Equation 4 below.

$$C_{a0} = C_a + rC_s \qquad \text{Equation 4}$$

Equation 4 can be rewritten as per Equation 5 below, where pH is the value of the pH after reaching an equilibrium state between the segments of analyte solution and the segments of sensing solution.

$$C_{a0} = \frac{10^{-pH}}{K} \frac{\alpha}{1-\alpha} \frac{R_T - (1-\alpha)C_T}{L_T - [R_T - (1-\alpha)C_T]} + r[R_T - (1-\alpha)C_T] \qquad \text{Equation 5}$$

It should be understood that other equations can be obtained by a person skilled in the art for each configuration/composition of the chemical indicator (i.e., each ion-sensitive ionophore/chromoionophore/ionic additive system).

In a scenario where $R_T = L_T = C_T$, Equation 5 can be rewritten as Equation 6.

$$C_{a0} = \frac{10^{-pH}}{K} \left(\frac{\alpha}{1-\alpha}\right)^2 + r\alpha C_T \qquad \text{Equation 6}$$

In a scenario where the analyte solution is buffered (i.e., the pH is constant) and assuming that $R_T$, $L_T$, $C_T$ and the pH are known, measuring the degree of deprotonation α for a given value of the ratio r can allow to obtain the initial concentration $Ca_0$, using equation 5 or 6.

In a scenario where the analyte solution is buffered (i.e., the pH is constant when varying α and r) and assuming that $R_T$, $L_T$, $C_T$ are known but that the pH is unknown, measuring the degree of deprotonation α as a function of the ratio r can allow for determining both the pH and the initial concentration $Ca_0$. For example, and as seen in Example 2 presented below, plotting $\alpha rC_T$ as a function of $\alpha^2(1-\alpha)^{-1}(L_T \cdot C_T^{-1}-\alpha)^{-1}$ can allow to obtain a linear plot having $C_{a0}$ as the intercept and $K10^{pH}$ as the slope.

In a scenario where the analyte solution is not buffered or partially buffered (i.e., the pH is not constant when varying α and r), the pH of the analyte solution will be affected for each ion $M^+$ transferred into the sensing solution, as a proton will be liberated into a non-buffered analyte solution. In such case, transferring an ion M+ from the analyte solution to the sensing solution is equivalent to adding a strong acid to the analyte solution. The effect is explained by the Van Slyke equation (Equation 7) shown below.

$$[H^+]_{added} = 10^{-pH} - \frac{K_{water}}{10^{-pH}} - C\frac{K_A}{K_A + 10^{-pH}} + B \qquad \text{Equation 7}$$

In the above equation $K_{water}$ is the dissociation constant of water ($10^{-14}$), C is the concentration of the buffer, B is the concentration of the conjugated base and $K_A$ the dissociation constant of the weak acid HA.

In terms of concentrations, the value $[H^+]_{added}$ (which corresponds to the amount of M+ transferred from the analyte solution to the sensing solution) is equal to $\alpha rC_T$ and Equation 7 can be rewritten as Equation 8 shown below.

$$r\alpha C_T = 10^{-pH} - \frac{K_{water}}{10^{-pH}} - C\frac{K_A}{K_A + 10^{-pH}} + B \qquad \text{Equation 8}$$

For a buffer of known parameters C, B and $K_A$, the variation of the pH can be calculated by numerically solving Equation 8.

For a buffer of unknown parameters C, B and/or $K_A$, the parameters can be fit to the plot α(r) using both Equations 7 and 8, in order to determine these parameters as well as $Ca_0$. This is exemplified in Example 3.

EXAMPLES

Example 1

Experiments were performed to obtain a calibration curve for sensing solution S1, selective to sodium ions.

Sensing solution S1 was prepared and includes the following components dissolved in chloroform:

sodium ionophore X (CAS No. 97600-39-0) as the ion-selective ionophore L, at a total concentration $L_T = 2.13 \times 10^{-4}$ mol/L;

chromoionophore-I (CAS No. 125829-24-5) as the chromoionophore C, at a total concentration $C_T = 6.87 \times 10^{-5}$ mol/L; and sodium tetrakis[3,5-bis(trifluoromethyl)phenyl]borate (CAS No. 79060-88-1) as the ionic component, at a total concentration $R_T = 1.00 \times 10^{-4}$ mol/L.

Sensing solution S1 was exposed to a Tris(hydroxymethyl)aminomethane buffer solution at pH 7.0 for removing the sodium ions from the ionic sites and to protonate the chromoionophore.

Sensing solution S1 was then exposed to aqueous buffer solutions (at pH=7.0) having different concentrations of sodium chloride. After the equilibrium is reached, UV-visible spectra were recorded and the dissociation values α calculated for each concentration of sodium chloride.

Figure 8:
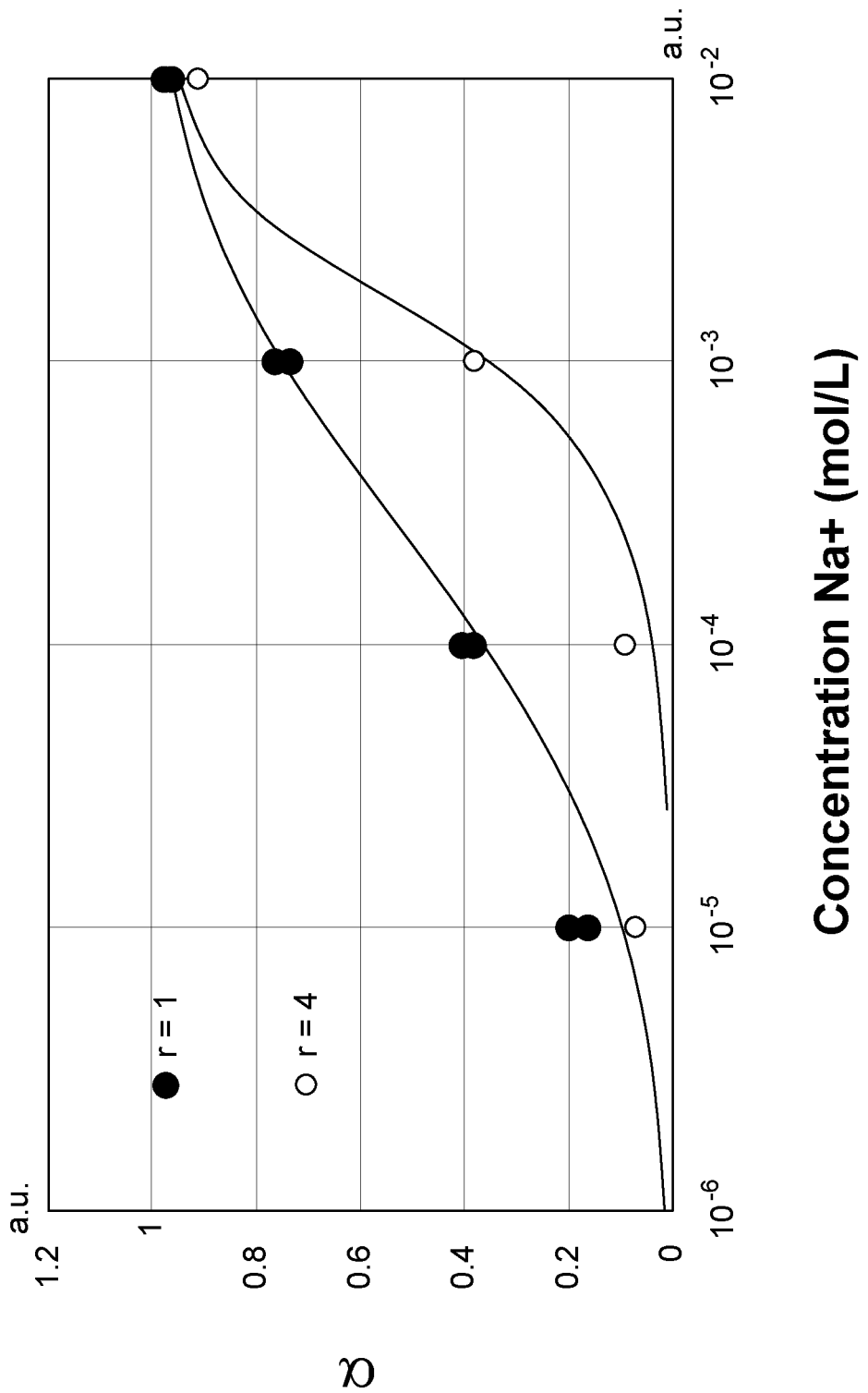
FIG. 8 is a series of plots comparing the degree of deprotonation $\alpha$ as a function of the initial sodium concentration in the analyte solution for r=1 and r=4.

Two series of measurements were performed at volumetric ratios r=1 and r=4. A graph showing α as a function of the sodium concentration of the aqueous buffer solution is shown at FIG. 8 for sensing solution S1. The concentrations used for the curve fitting are shown in Table 1 below. One observes that the concentration $R_T$ is set equal to $C_T$ and differs from the weighted value of the composition S1. The correct curve fitting with $R_T = C_T$ demonstrates that the excess of ionic site has no effect on the chemical equilibrium in the sensing solution.

TABLE 1 fitted values of $R_T$, $L_T$ and $C_T$ (in mol/L)

| r | $R_T$ | $L_T$ | $C_T$ |
|---|---|---|---|
| 1 | $6.87 \times 10^{-5}$ | $2.13 \times 10^{-4}$ | $6.87 \times 10^{-5}$ |
| 4 | $6.60 \times 10^{-4}$ | $2.12 \times 10^{-3}$ | $6.60 \times 10^{-4}$ |

For each series of measurements, the equilibrium constant K was calculated by solving Equation 5 and was found to be $K=10^{-4}$. FIG. 8 shows that the calibration curves depend on the volumetric ratio r.

Example 2

An aqueous solution A1 having a sodium chloride concentration of $10^{-3}$ mol/L and a pH of 7.0 was prepared. Experiments were performed to measure the sodium ion concentration of the aqueous solution A1, using sensing solution S2 described below and sensing solution S1 of Example 1, which are selective to sodium ions.

Sensing solution S2 was prepared and includes the following components dissolved in chloroform:
  sodium ionophore X (CAS No. 97600-39-0) as the ion-selective ionophore L, at a total concentration $L_T = 2.12 \times 10^{-3}$ mol/L;
  chromoionophore-I (CAS No. 125829-24-5) as the chromoionophore C, at a total concentration $C_T = 6.60 \times 10^{-4}$ mol/L; and
  sodium tetrakis[3,5-bis(trifluoromethyl)phenyl]borate (CAS No. 79060-88-1) as the ionic component, at a total concentration $R_T = 1.02 \times 10^{-3}$ mol/L.

Sensing solution S1 of Example 1 was also used.

Sensing solutions S2 and S1 were exposed to aqueous solution A1 with volumetric ratios r=4 and r=1, until the equilibrium is reached.

Using Equation 5 with $C_T = R_T$ and plotting $\alpha.r.C_T$ as a function of $\alpha^2(1-\alpha)^{-1}(L_T \cdot C_T^{-1} - \alpha)^{-1}$ gave a linear plot, wherein the intercept allowed to determine the initial sodium concentration in aqueous solution A1, and wherein the slope allowed to determine the pH of the aqueous solution A1 (knowing that pK=4, as determined in Example 1).

Figure 9:
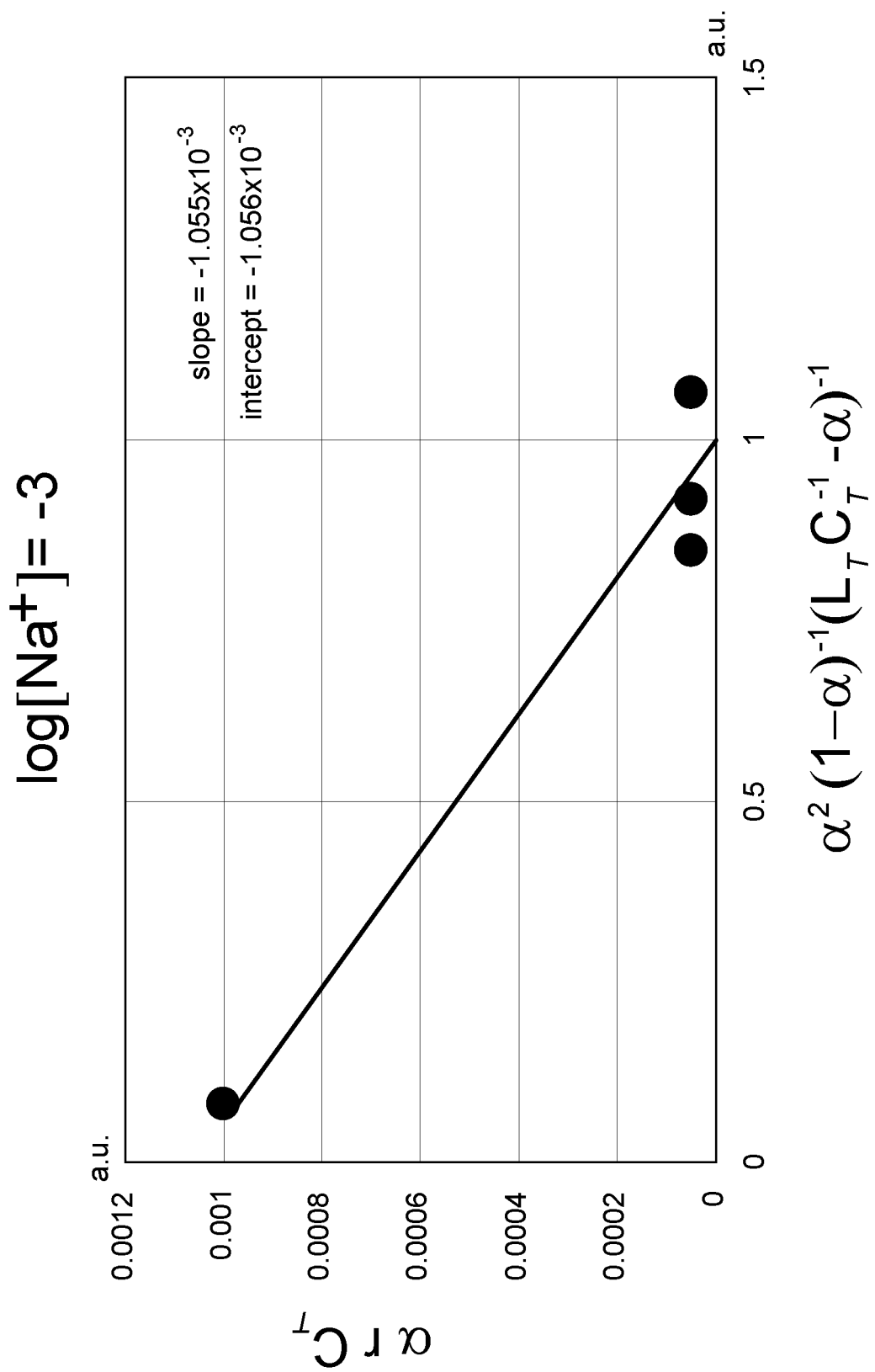
FIG. 9 is a linear plot for determining the initial concentration in sodium ions and the initial pH.

FIG. 9 shows a plot of $\alpha.r.C_T$ as a function of $\alpha^2(1-\alpha)^{-1}(L_T \cdot C_T^{-1} - \alpha)^{-1}$ for the combined sensing with solutions S1 and S2.

From the plot of FIG. 9, the sodium concentration was calculated to be $1.056 \times 10^{-3}$ mol/L and the pH was calculated to be 6.98. The true values were $1.02 \times 10^{-3}$ mol/L and 7.00.

Example 3

Example 3 is based on simulations.

Simulations were performed for determining the initial concentration $Ca_0$ of a targeted ion M+ in solution, as well as parameters B, C and $K_A$ of a buffer, by 4D-fitting of Equations 7 and 9.

The analyte solution was set at an initial sodium concentration $Ca_0 = 0.01$ mol/L, which is to be determined by the simulation. The buffer included a weak acid having a pKa of 6 and a concentration $C = 3.16 \times 10^{-4}$ mol/L. A base was added at a concentration $B = 1.58 \times 10^{-4}$ mol/L, thereby setting the initial pH at 6.

Figure 10B:
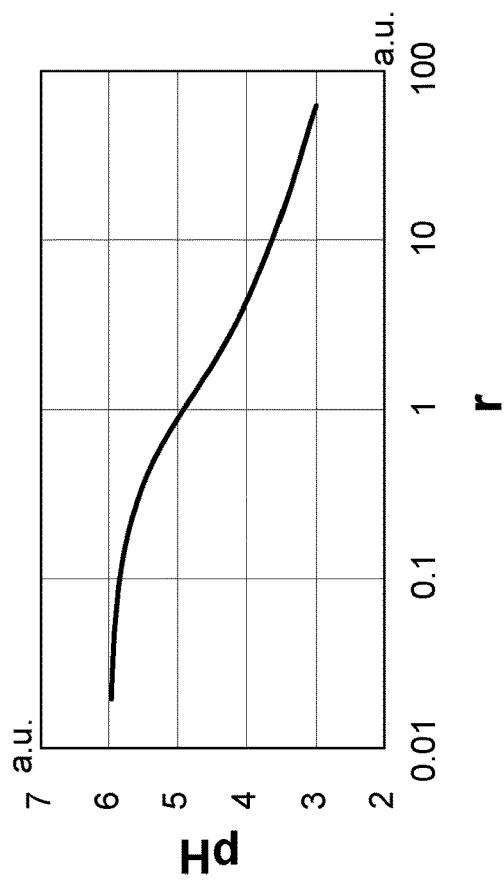
FIG. 10B is a simulated plot of the pH of an analyte solution as a function of r, for determining the parameters of an analyte solution by 4D-fitting, in conjunction with the plot of FIG. 10A.
Figure 10A:
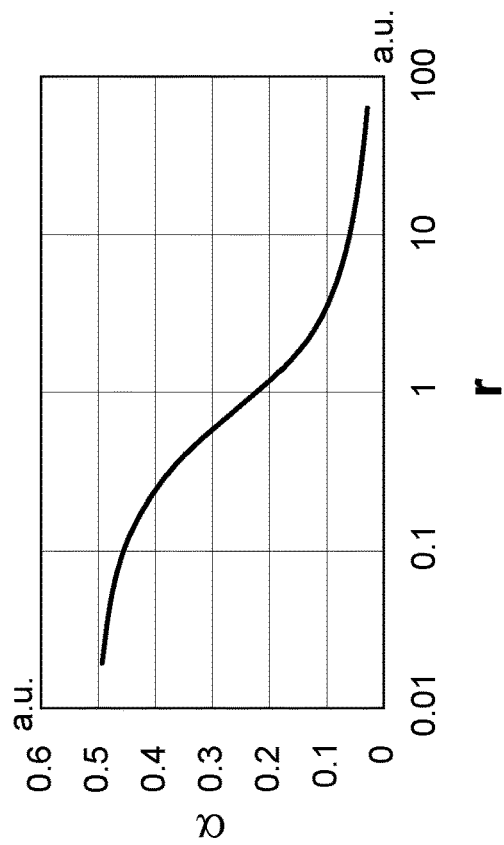
FIG. 10A is a simulated plot of $\alpha$ as a function of r, for determining the parameters of an analyte solution by 4D-fitting, in conjunction with the plot of FIG. 10B.

FIG. 10A shows a simulated $\alpha(r)$ plot, and FIG. 10B shows a simulated pH plot as a function of r, for a sensing solution sensitive to sodium ions and having an equilibrium constant $K = 10^{-4}$. The composition of the sensing solution was $L_T = R_T = C_T = 6.60 \times 10^{-4}$ mol/L. As r is increased, more protons were transferred from the sensing solution to the analyte solution and the pH of the analyte solution dropped, as can be seen on FIG. 10B. For small r values, the pH was relatively stable around 6. For r values greater than 0.1, the buffer effect is not sufficient for maintaining the pH, which started to drop.

4D-fitting of Equations 7 and 9 was performed by equalizing the pH value for both equations, which yielded Equation 9 below.

$$r\alpha C_T = (C_{a0} - r\alpha C_T)K\left(\frac{1-\alpha}{\alpha}\right)^2 - \frac{K_{eau}}{(C_{a0} - r\alpha C_T)K\left(\frac{1-\alpha}{\alpha}\right)^2} - $$
$$C\frac{K_A}{K_A + (C_{a0} - r\alpha C_T)K\left(\frac{1-\alpha}{\alpha}\right)^2} + B$$

Equation 9

Table 2 shows simulated values which were fitted using the $\alpha(r)$ plot compared to the simulated values.

TABLE 2

4D-fitting of a curve α vs r.

| parameter | Input values | 4D fitting values |
|---|---|---|
| $C_{a0}$ | 0.010000 M | 0.010001 M |
| C | $3.1600 \times 10^{-4}$ M | $3.1419 \times 10^{-4}$ M |
| B | $1.5800 \times 10^{-4}$ M | $1.5815 \times 10^{-4}$ M |
| $pK_A$ | 6.000 | 5.995 |
| $pH_0$ | 6.000 | 6.006 |

It can be seen that the fitting of the values are close to the input values. It is understood that background noise in the measured values of $\alpha(r)$ can reduce the accuracy of the fitted parameters.

Example 4

Example 4 is based on simulations.

Figure 11:
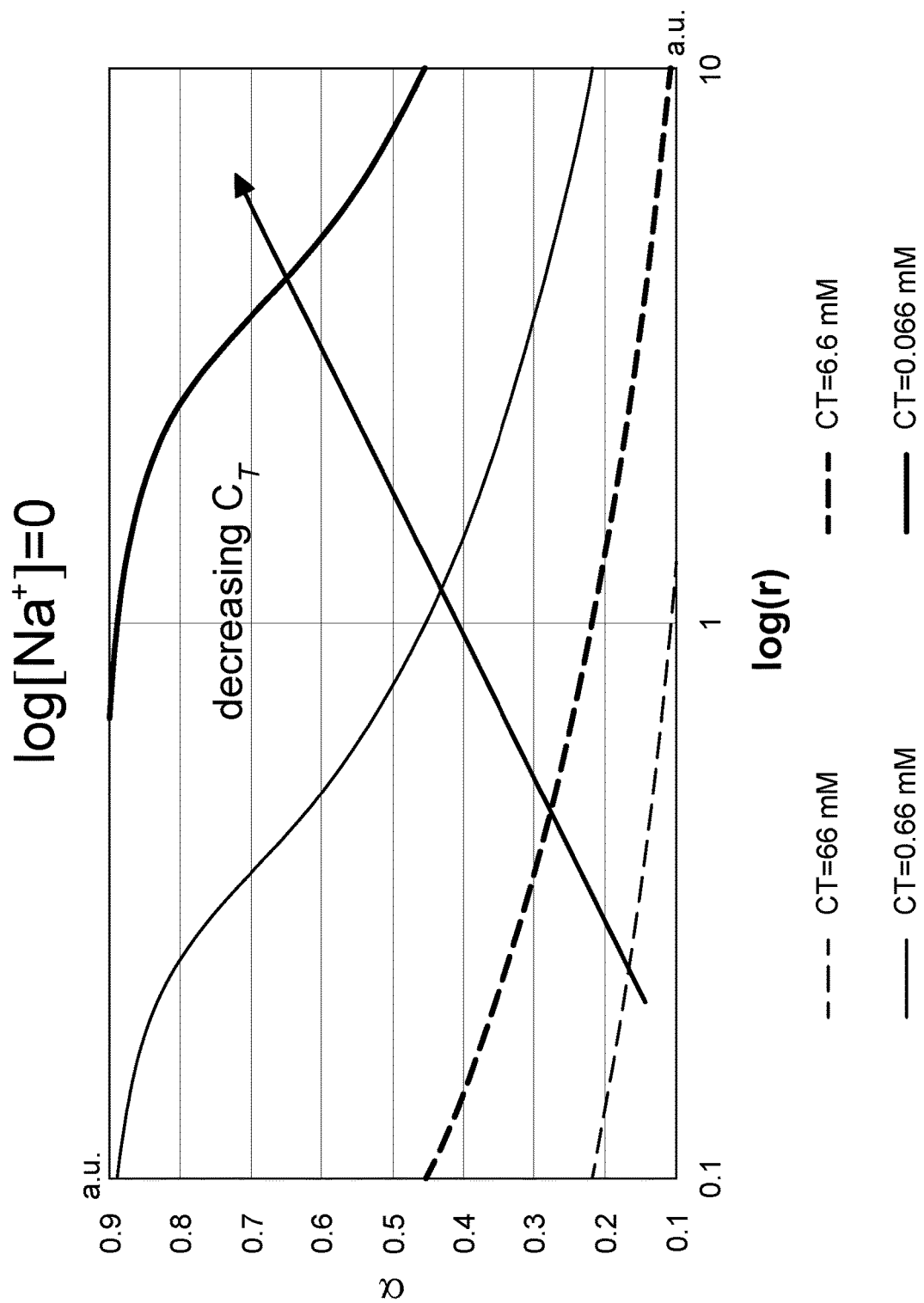
FIG. 11 is a series of simulated plots of $\alpha$ as a function of log(r), showing the effect of varying the value of the total concentration of chromoionophore $C_T$.

Simulations were conducted to show the effect of a variation of $C_T$ on $\alpha(r)$. FIG. 11 shows a series of $\alpha(r)$ plots for different values of $C_T$. The sodium concentration of the analyte solution was set at 1 mol/L and the value of $C_T$ was set at $6.6 \times 10^{-2}$ mol/L, $6.6 \times 10^{-3}$ mol/L, $6.6 \times 10^{-4}$ mol/L and $6.6 \times 10^{-5}$ mol/L, respectively. It can be seen that $C_T$ can be advantageously selected at $6.6 \times 10^{-4}$ mol/L (0.66 mM) in order to allow for measurements across all the values of α and all the values of the ratio r (such as between 0.1 and 10), for determining the initial sodium concentration of an analyte solution.

The invention claimed is:
1. A method for determining a concentration of an ionic analyte in an analyte solution, the method comprising:
   providing a sensing solution immiscible with the analyte solution so that the analyte solution and the sensing solution cannot completely mix or blend to form a homogeneous substance, while allowing for traces of the analyte solution to be soluble in the sensing solution and conversely, the sensing solution comprising a chemical indicator responsive to the ionic analyte, wherein the sensing solution is a liquid in which the chemical indicator is solubilized, the chemical indicator comprising:

an ionic additive providing electroneutrality in the sensing solution;
an ion-selective ionophore able to reversibly bind the ionic analyte; and
a chromoionophore for providing a response of the chemical indicator based on the binding of the ionic analyte and the ion-selective ionophore;
injecting at least one train of segments into a microfluidic channel having a first end and a second end, wherein each one of the segments from each of the at least one train of segments is a discrete amount of liquid provided in the microfluidic channel, each of the at least one train of segments comprising:
segments of analyte solution having a volume Va; and
segments of sensing solution having a volume Vs, wherein each of the at least one train of segments is characterized by a value of the ratio r=Vs/Va, each segment of analyte solution being in surface contact with at least one contacting segment of sensing solution;
circulating the at least one train of segments from the first end to the second end of the microfluidic channel by operating a fluid control device, wherein a reversible chemical exchange occurs between the ionic analyte of each segment of analyte solution and the chemical indicator of the at least one contacting segment of sensing solution during circulation of the at least one train of segments from the first end to the second end of the microfluidic channel;
measuring a response of the chemical indicator at the second end of the microfluidic channel; and
determining the concentration of the ionic analyte in the analyte solution based on the response.

2. The method of claim 1, wherein the at least one train of segments comprises a plurality of trains of segments, and wherein:
circulating the at least one train of segments comprises circulating each train of segments from the first end to the second end of the microfluidic channel, such that in each train of segments, the reversible chemical exchange occurs between the ionic analyte of each segment of analyte solution and the chemical indicator of the at least one contacting segment of sensing solution;
measuring a response of the chemical indicator comprises measuring a response of the chemical indicator at the second end of the microfluidic channel for each train of segments, thereby obtaining a set of responses of the chemical indicator as a function of the ratio r; and
determining the concentration of the ionic analyte comprises determining the concentration of the ionic analyte in the analyte solution based on the set of responses.

3. The method of claim 2, wherein Vs is kept constant and Va is variable in order to obtain each value of the ratio r or wherein Va is kept constant and Vs is variable in order to obtain each value of the ratio r.

4. The method of claim 1, wherein the at least one train of segments has a predetermined number of segments.

5. The method of claim 1, wherein the at least one train of segments has an equal number of segments of analyte solution and segments of sensing solution.

6. The method of claim 1, wherein the reversible chemical exchange reaches an equilibrium state prior to measuring a response of the chemical indicator.

7. The method of claim 1, wherein the at least one train of segments comprises sets of segments, each set of segments comprising at least one segment of analyte solution in surface contact with at least one segment of sensing solution, the sets of segments being separated from one another by a carrier fluid immiscible with the analyte solution and the sensing solution.

8. The method of claim 1, further comprising exposing the segments of sensing solution to the analyte solution prior to injecting the train of segments into the microfluidic channel.

9. The method of claim 1, wherein the analyte solution is an aqueous solution and the sensing solution comprises an organic solvent.

10. The method of claim 1, wherein the response of the chemical indicator is an optical response.

11. The method of claim 1, wherein the response comprises a change in the perceivable color of the segments of sensing solution upon exposure to the ionic analyte.

12. The method of claim 1, wherein the response comprises a change in optical absorption spectrum, optical transmission spectrum, reflection spectrum, Raman spectrum or fluorescence spectrum of the segments of sensing solution upon exposure to the ionic analyte.

13. The method of claim 1, further comprising regenerating the segments of sensing solution at the second end of the microfluidic channel.

14. The method of claim 1, wherein the sensing solution is free of the ionic analyte prior to injecting the sensing solution into the microfluidic channel.

15. A method for determining a concentration of an ionic analyte in an analyte solution, the method comprising:
providing a sensing solution immiscible with the analyte solution so that the analyte solution and the sensing solution cannot completely mix or blend to form a homogeneous substance, while allowing for traces of the analyte solution to be soluble in the sensing solution and conversely, the sensing solution comprising a chemical indicator responsive to the ionic analyte, wherein the sensing solution is a liquid in which the chemical indicator is solubilized, the chemical indicator comprising:
an ionic additive providing electroneutrality in the sensing solution;
an ion-selective ionophore able to reversibly bind the ionic analyte; and
a chromoionophore for providing a response of the chemical indicator based on the binding of the ionic analyte and the ion-selective ionophore;
injecting trains of segments into a microfluidic channel having a first end and a second end, wherein each one of the segments from the trains of segments is a discrete amount of liquid provided in the microfluidic channel; each train of segments comprising:
segments of analyte solution, each having a volume Va; and
segments of sensing solution, each having a volume Vs,
each segment of analyte solution being in surface contact with at least one contacting segment of sensing solution, each train of segments being characterized by a value of the ratio r=Vs/Va;
circulating each train of segments from the first end to the second end of the microfluidic channel by operating a fluid control device, wherein a reversible chemical exchange occurs between the ionic analyte of each segment of analyte solution and the chemical indicator of the at least one contacting segment of sensing solution during circulation of each train of segments from the first end to the second end of the microfluidic channel;

measuring a response of the chemical indicator at the second end of the microfluidic channel for each train of segments, thereby obtaining a set of responses of the chemical indicator as a function of the ratio r; and determining the concentration of the ionic analyte in the analyte solution based on the set of responses.

16. A system for detecting an ionic analyte in an analyte solution, the system comprising:

a microfluidic channel having a first end and a second end;

a flow controller unit to control a flow control device configured to inject at least one train of segments into the microfluidic channel and to circulate the at least one train of segments from the first end to the second end of the microfluidic channel, each of the at least one train of segments comprising:

segments of analyte solution having a volume Va;

segments of sensing solution having a volume Vs, wherein each of the at least one train of segments is characterized by a ratio r=Vs/Va, each segment of analyte solution being in surface contact with at least one contacting segment of sensing solution; and a detector in communication with the flow controller unit configured to measure a response of a chemical indicator in the segments of sensing solution at the second end of the microfluidic channel, the chemical indicator comprising:

an ionic additive providing electroneutrality in the sensing solution;

an ion-selective ionophore able to reversibly bind the ionic analyte; and a chromoionophore for providing the response of the chemical indicator based on the binding of the ionic analyte and the ion-selective ionophore;

a processor for determining the concentration of the ionic analyte in the analyte solution based on the response;

wherein the sensing solution is a liquid in which the chemical indicator is solubilized;

wherein each one of the segments from the at least one train of segments is a discrete amount of liquid provided in the microfluidic channel; and wherein a reversible chemical exchange occurs in the microfluidic channel between the ionic analyte of each segment of analyte solution and the chemical indicator of the at least one contacting segment of sensing solution during the circulation of the at least one train of segments;

wherein the sensing solution is immiscible with the analyte solution so that the analyte solution and the sensing solution cannot completely mix or blend to form a homogeneous substance, while allowing for traces of the analyte solution to be soluble in the sensing solution and conversely.

17. The method of claim 1, wherein the fluid control device is selected from the group consisting of a rotary drive, a micropump, a syringe pump, a pressure controller, a peristaltic pump, a recirculation pump and a microvalve.

* * * * *